（12） United States Patent
Sadr et al.

(10) Patent No.: US 9,731,675 B2
(45) Date of Patent: *Aug. 15, 2017

(54) ACTIVE BOLSTER

(71) Applicant: SALFLEX POLYMERS LTD., Weston (CA)

(72) Inventors: Changize Sadr, North York (CA); Ali Totonchian, Totonchian (CA); Michael Best, Newmarket (CA); Rimas Ciplijauskas, Etobicoke (CA); Raj Roychoudhury, Bloomfield Hills, MI (US)

(73) Assignee: ABC GROUP INC., Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,265

(22) Filed: Jun. 29, 2015

(65) Prior Publication Data
US 2015/0298642 A1 Oct. 22, 2015

Related U.S. Application Data

(60) Continuation of application No. 14/453,959, filed on Aug. 7, 2014, now Pat. No. 9,085,275, which is a
(Continued)

(51) Int. Cl.
*B60R 21/207* (2006.01)
*B60R 21/231* (2011.01)
(Continued)

(52) U.S. Cl.
CPC .... *B60R 21/23138* (2013.01); *B60R 21/0428* (2013.01); *B60R 21/13* (2013.01);
(Continued)

(58) Field of Classification Search
CPC ........ B60R 21/20; B60R 21/23; B60R 21/207; B60R 2021/23146; B60R 2021/2078
See application file for complete search history.

(56) References Cited

U.S. PATENT DOCUMENTS

| 2,834,606 | A | 5/1958 | Bertrand |
| 3,185,497 | A | 5/1965 | Charleas Lagace |

(Continued)

FOREIGN PATENT DOCUMENTS

| AT | 404746 | 2/1999 |
| DE | 1112266 | 8/1961 |

(Continued)

OTHER PUBLICATIONS

Office Action in relation to U.S. Appl. No. 12/955,491, mailed Jun. 16, 2011.
(Continued)

*Primary Examiner* — Faye M Fleming
(74) *Attorney, Agent, or Firm* — Michael Best & Friedrich LLP

(57) ABSTRACT

An active bolster for a vehicle is provided, wherein the bolster comprises an expansible hollow interior that is inflatable and is self-supporting in both an inflated and in an uninflated position. The bolster has an inflator module for inflating the expansible hollow interior. The bolster has an inner wall for projecting inwardly into the vehicle and away from the side of the vehicle on inflation of the expansible hollow interior. The bolster may have a relatively non-expansible component located between a first expansible chamber and a second expansible chamber. The bolster may comprise an outer wall having an attachment portion for attaching the outer wall to a portion of the side of the vehicle.

3 Claims, 36 Drawing Sheets

Related U.S. Application Data continuation of application No. 14/010,200, filed on Aug. 26, 2013, now Pat. No. 8,801,032, which is a continuation of application No. 13/532,561, filed on Jun. 25, 2012, now Pat. No. 8,544,880, which is a continuation of application No. 12/955,491, filed on Nov. 29, 2010, now Pat. No. 8,231,138, which is a division of application No. 11/915,797, filed as application No. PCT/US2006/021507 on Jun. 2, 2006, now abandoned.

(60) Provisional application No. 60/687,035, filed on Jun. 3, 2005, provisional application No. 60/762,463, filed on Jan. 26, 2006.

(51) Int. Cl.

| | |
|---|---|
| B60R 21/217 | (2011.01) |
| B60R 21/13 | (2006.01) |
| B60R 21/20 | (2011.01) |
| B60R 21/21 | (2011.01) |
| B60R 21/213 | (2011.01) |
| B60R 21/235 | (2006.01) |
| B60R 21/04 | (2006.01) |
| B60R 21/23 | (2006.01) |
| B60R 21/239 | (2006.01) |
| B60R 21/00 | (2006.01) |
| B60R 21/261 | (2011.01) |

(52) U.S. Cl.
CPC ............ *B60R 21/20* (2013.01); *B60R 21/207* (2013.01); *B60R 21/21* (2013.01); *B60R 21/213* (2013.01); *B60R 21/217* (2013.01); *B60R 21/23* (2013.01); *B60R 21/235* (2013.01); *B60R 21/239* (2013.01); *B60R 2021/0004* (2013.01); *B60R 2021/0006* (2013.01); *B60R 2021/0407* (2013.01); *B60R 2021/132* (2013.01); *B60R 2021/2074* (2013.01); *B60R 2021/23107* (2013.01); *B60R 2021/23146* (2013.01); *B60R 2021/23153* (2013.01); *B60R 2021/23169* (2013.01); *B60R 2021/23176* (2013.01); *B60R 2021/23192* (2013.01); *B60R 2021/23519* (2013.01); *B60R 2021/2612* (2013.01); *B60R 2021/2615* (2013.01)

(56) References Cited

U.S. PATENT DOCUMENTS

| | | |
|---|---|---|
| 3,473,824 A | 10/1969 | Carey et al. |
| 3,963,362 A | 6/1976 | Hollis |
| 3,981,518 A | 9/1976 | Pulling |
| 4,203,616 A | 5/1980 | Okada |
| 4,297,051 A | 10/1981 | Robinson |
| 4,362,425 A | 12/1982 | Dixon |
| 4,511,281 A | 4/1985 | Schmanski |
| 4,518,172 A | 5/1985 | Bortz et al. |
| 4,597,691 A | 7/1986 | Clarke |
| 4,623,192 A * | 11/1986 | Koide ............... B60N 2/4221 297/284.11 |
| 4,709,943 A | 12/1987 | Yoshimura et al. |
| 4,721,329 A | 1/1988 | Brantman et al. |
| 4,951,963 A | 8/1990 | Behr et al. |
| 5,082,310 A | 1/1992 | Bauer |
| 5,138,721 A | 8/1992 | Spector |
| 5,273,309 A | 12/1993 | Lau et al. |
| 5,312,133 A | 5/1994 | Pietila et al. |
| 5,324,070 A | 6/1994 | Kitawaga et al. |
| 5,324,072 A | 6/1994 | Olson et al. |
| 5,364,125 A | 11/1994 | Brown et al. |
| 5,370,417 A | 12/1994 | Kelman et al. |
| 5,382,051 A | 1/1995 | Glance |
| 5,447,326 A | 9/1995 | Laske et al. |
| 5,456,490 A | 10/1995 | Carter et al. |
| 5,458,366 A | 10/1995 | Hock et al. |
| 5,476,283 A | 12/1995 | Elton |
| 5,498,026 A | 3/1996 | Eckhout |
| 5,524,924 A | 6/1996 | Steffens et al. |
| 5,533,748 A | 7/1996 | Wirt et al. |
| 5,536,043 A | 7/1996 | Lang et al. |
| 5,544,913 A | 8/1996 | Yamanishi et al. |
| 5,549,327 A | 8/1996 | Rusche et al. |
| 5,556,128 A | 9/1996 | Sinnhuber et al. |
| 5,567,375 A | 10/1996 | Filion et al. |
| 5,615,914 A | 4/1997 | Galbraith et al. |
| 5,630,621 A | 5/1997 | Schneider |
| 5,695,242 A * | 12/1997 | Brantman ............ B60N 2/4221 280/730.1 |
| 5,716,093 A | 2/1998 | Sadr |
| 5,718,449 A | 2/1998 | Numazawa et al. |
| 5,775,729 A | 7/1998 | Schneider et al. |
| 5,810,390 A * | 9/1998 | Enders ................ B60R 21/2176 280/728.2 |
| 5,816,613 A | 10/1998 | Specht et al. |
| 5,845,937 A | 12/1998 | Smith |
| 5,865,468 A | 2/1999 | Hur |
| 5,927,755 A | 7/1999 | Matsuo et al. |
| D412,880 S | 8/1999 | Sadr |
| 5,931,493 A | 8/1999 | Sutherland |
| 5,957,493 A | 9/1999 | Larsen et al. |
| 5,967,594 A | 10/1999 | Ramanujam |
| 5,968,431 A | 10/1999 | Ang et al. |
| 6,032,978 A * | 3/2000 | Spencer ................ B60R 21/045 280/730.1 |
| 6,131,950 A | 10/2000 | Schroter |
| 6,142,520 A | 11/2000 | Iino et al. |
| 6,158,766 A | 12/2000 | Kowalski |
| 6,170,871 B1 | 1/2001 | Goestenkors et al. |
| 6,193,272 B1 | 2/2001 | Aigner et al. |
| 6,203,057 B1 | 3/2001 | Spencer et al. |
| 6,213,497 B1 | 4/2001 | Spencer et al. |
| 6,231,072 B1 | 5/2001 | Pywell et al. |
| 6,250,665 B1 | 6/2001 | Sutherland et al. |
| 6,270,131 B1 | 8/2001 | Martinez et al. |
| 6,299,209 B1 | 10/2001 | Ankersson et al. |
| 6,302,437 B1 | 10/2001 | Marriott et al. |
| 6,305,710 B1 | 10/2001 | Bosgeitet et al. |
| 6,336,653 B1 | 1/2002 | Yaniv et al. |
| 6,338,501 B1 | 1/2002 | Heilig et al. |
| 6,416,079 B1 | 7/2002 | Lutz et al. |
| 6,431,584 B1 | 8/2002 | Nagasawa et al. |
| 6,435,554 B1 | 8/2002 | Feldman |
| 6,471,242 B2 | 10/2002 | Schneider |
| 6,517,103 B1 | 2/2003 | Schneider |
| 6,536,802 B1 | 3/2003 | Sutherland et al. |
| 6,543,838 B1 | 4/2003 | Bertolini et al. |
| 6,568,743 B1 | 5/2003 | Jayasuriya et al. |
| 6,578,867 B2 | 6/2003 | Khoudari et al. |
| 6,588,557 B2 | 7/2003 | Williams et al. |
| 6,619,689 B2 | 9/2003 | Spencer et al. |
| 6,682,141 B2 * | 1/2004 | Reynolds ............ B60N 2/42763 296/68.1 |
| 6,688,643 B2 | 2/2004 | Schneider |
| 6,712,385 B2 | 3/2004 | Enders |
| 6,715,789 B2 | 4/2004 | Takimoto et al. |
| 6,752,417 B2 | 6/2004 | Takimoto et al. |
| 6,758,493 B2 | 7/2004 | Conlee et al. |
| 6,817,625 B2 | 11/2004 | Hjerpe |
| 6,817,627 B2 | 11/2004 | Galmiche et al. |
| 6,848,715 B2 | 2/2005 | Nelson et al. |
| 6,874,811 B2 | 4/2005 | Enders et al. |
| 6,971,667 B2 | 12/2005 | Enders et al. |
| 6,976,706 B2 | 12/2005 | Smith et al. |
| 6,991,252 B2 | 1/2006 | Enders |
| 7,021,652 B2 | 4/2006 | Kumagai et al. |
| 7,055,083 B2 | 5/2006 | Wang |
| 7,055,853 B2 | 6/2006 | Honda et al. |
| 7,086,663 B2 | 8/2006 | Honda |
| 7,093,846 B2 | 8/2006 | Reiter et al. |
| 7,093,851 B2 | 8/2006 | Lotspih |

(56) References Cited

U.S. PATENT DOCUMENTS

| | | |
|---|---|---|
| 7,144,032 B2 | 12/2006 | Lunt et al. |
| 7,168,733 B2 | 1/2007 | Kumagai et al. |
| 7,213,840 B2 | 5/2007 | Kumagai |
| 7,249,781 B2 | 7/2007 | Kai et al. |
| 7,322,598 B2 | 1/2008 | Galmiche et al. |
| 7,350,852 B2 | 4/2008 | Rush et al. |
| 7,367,587 B2 | 5/2008 | Taoka |
| 7,393,013 B2 | 7/2008 | Best et al. |
| 7,396,040 B2 | 7/2008 | Enders et al. |
| 7,413,215 B2 | 8/2008 | Weston et al. |
| 7,422,234 B2 | 9/2008 | Huber et al. |
| 7,448,645 B2 | 11/2008 | Bederka et al. |
| 7,481,457 B2 | 1/2009 | Best et al. |
| 7,568,722 B2 | 8/2009 | Sato et al. |
| 7,578,518 B2 | 8/2009 | Ochiai et al. |
| 7,735,865 B2 | 6/2010 | Cappabianca et al. |
| 7,874,587 B2 | 1/2011 | Miki et al. |
| 7,980,589 B2 | 7/2011 | Best et al. |
| 8,146,943 B2 | 4/2012 | Fukawatase et al. |
| 8,220,827 B2 | 7/2012 | Schirm |
| 8,231,138 B2 | 7/2012 | Sadr et al. |
| 8,297,646 B2 | 10/2012 | Aoki |
| 8,544,879 B1 | 10/2013 | Mazzocchi et al. |
| 8,801,032 B2 * | 8/2014 | Sadr .................. B60R 21/13 280/730.2 |
| 9,126,510 B2 * | 9/2015 | Hirako ............... B60N 2/42763 |
| 2001/0054811 A1 | 12/2001 | Spencer et al. |
| 2002/0125691 A1 | 9/2002 | Conlee et al. |
| 2002/0171231 A1 | 11/2002 | Takimoto et al. |
| 2003/0127819 A1 | 7/2003 | Richardson |
| 2003/0197354 A1 | 10/2003 | Beland et al. |
| 2004/0007856 A1 | 1/2004 | Enders et al. |
| 2004/0075251 A1 | 4/2004 | Fujii et al. |
| 2004/0075252 A1 | 4/2004 | Pan |
| 2004/0099644 A1 | 5/2004 | Allen |
| 2004/0100075 A1 | 5/2004 | Sakai et al. |
| 2004/0135353 A1 | 7/2004 | Enders et al. |
| 2004/0145163 A1 | 7/2004 | Galmiche et al. |
| 2004/0155447 A1 | 8/2004 | Smith et al. |
| 2004/0163872 A1 | 8/2004 | Lincoln et al. |
| 2004/0163873 A1 | 8/2004 | Polz et al. |
| 2004/0178616 A1 | 9/2004 | Yoshikawa |
| 2004/0232666 A1 | 11/2004 | Sato et al. |
| 2004/0256842 A1 | 12/2004 | Breed |
| 2005/0023802 A1 | 2/2005 | Enders et al. |
| 2005/0029781 A1 | 2/2005 | Enders et al. |
| 2005/0052005 A1 | 3/2005 | Lunt et al. |
| 2005/0052010 A1 | 3/2005 | Best et al. |
| 2005/0052011 A1 | 3/2005 | Best et al. |
| 2005/0057024 A1 | 3/2005 | Weston et al. |
| 2005/0073134 A1 | 4/2005 | Matsuura et al. |
| 2005/0098996 A1 | 5/2005 | Enders |
| 2005/0116449 A1 | 6/2005 | Enders |
| 2005/0253369 A1 | 11/2005 | Taoka |
| 2006/0119149 A1 * | 6/2006 | Yoshikawa ........ B60N 2/42718 297/216.1 |
| 2006/0214400 A1 | 9/2006 | Enders et al. |
| 2007/0007753 A1 | 1/2007 | Williams et al. |
| 2007/0052219 A1 | 3/2007 | Rust et al. |
| 2007/0108746 A1 | 5/2007 | Ochiai et al. |
| 2007/0108747 A1 | 5/2007 | Roychoudhury et al. |
| 2007/0152431 A1 | 7/2007 | Rust et al. |
| 2007/0273179 A1 | 11/2007 | Hommel et al. |
| 2007/0296187 A1 | 12/2007 | Ochiai |
| 2008/0061537 A1 | 3/2008 | Enders |
| 2008/0203714 A1 | 8/2008 | Untersinger et al. |
| 2009/0152848 A1 | 6/2009 | Sadr et al. |
| 2009/0152849 A1 | 6/2009 | Saraf et al. |
| 2009/0250915 A1 | 10/2009 | Best et al. |
| 2010/0052296 A1 | 3/2010 | Sasaki et al. |
| 2010/0194081 A1 | 8/2010 | Thomas et al. |
| 2010/0320736 A1 | 12/2010 | Traber et al. |
| 2010/0327566 A1 | 12/2010 | Matsushima |
| 2011/0109064 A1 | 5/2011 | Best et al. |
| 2011/0115201 A1 | 5/2011 | Best et al. |
| 2011/0123739 A1 | 5/2011 | Ciplijauskas et al. |
| 2011/0133435 A1 | 6/2011 | Sadr et al. |
| 2011/0156378 A1 | 6/2011 | Matsushima et al. |
| 2011/0198827 A1 | 8/2011 | Roychoudhury |
| 2011/0272926 A1 | 11/2011 | Roychoudhury et al. |
| 2012/0080871 A1 | 4/2012 | Roychoudhury |
| 2013/0056964 A1 * | 3/2013 | Yamashita ......... B60N 2/42718 280/730.1 |
| 2014/0001799 A1 * | 1/2014 | Kalisz .................. B60R 21/207 297/216.1 |
| 2014/0306497 A1 * | 10/2014 | Fukawatase .......... B60R 21/207 297/216.1 |
| 2014/0346819 A1 * | 11/2014 | Fukawatase .......... B60N 2/4221 297/180.1 |
| 2015/0061268 A1 * | 3/2015 | Nagasawa ............. B60R 21/231 280/730.1 |

FOREIGN PATENT DOCUMENTS

| | | |
|---|---|---|
| DE | 3737081 | 5/1989 |
| DE | 19546143 | 6/1997 |
| DE | 19858520 | 4/2000 |
| DE | 10123207 | 7/2002 |
| DE | 69925372 T2 | 1/2006 |
| EP | 0274535 | 7/1988 |
| EP | 0678425 | 10/1995 |
| EP | 0872390 | 10/1998 |
| EP | 1426249 | 6/2004 |
| EP | 1663725 | 12/2009 |
| GB | 2272670 | 5/1994 |
| GB | 2335171 | 9/1999 |
| JP | 57058532 | 4/1982 |
| JP | 63-002741 | 1/1988 |
| JP | 6320774 | 8/1988 |
| JP | 01314645 A * | 12/1989 ........... B60R 21/207 |
| JP | 282946 | 6/1990 |
| JP | 2249740 | 10/1990 |
| JP | 5016758 | 1/1993 |
| JP | 06-037011 | 5/1994 |
| JP | 7291084 | 11/1995 |
| JP | H08-258604 | 10/1996 |
| JP | 10504784 | 5/1998 |
| JP | 10512210 | 11/1998 |
| JP | H10-329636 | 12/1998 |
| JP | H11-028998 | 2/1999 |
| JP | 11-091454 | 4/1999 |
| JP | 11334504 A | 12/1999 |
| JP | 11334515 | 12/1999 |
| JP | 2000006751 | 1/2000 |
| JP | 2000-326810 | 11/2000 |
| JP | 2002-522286 | 7/2002 |
| JP | 2003517966 | 6/2003 |
| JP | 2004026126 | 1/2004 |
| JP | 2004182231 | 7/2004 |
| JP | 2004249960 | 9/2004 |
| JP | 2004-338677 | 12/2004 |
| JP | 2005297580 | 10/2005 |
| JP | 2007-504050 | 3/2007 |
| JP | 2007-090954 | 4/2007 |
| JP | 4083653 | 4/2008 |
| JP | 4136876 | 8/2008 |
| WO | 00/07851 | 2/2000 |
| WO | 00/50270 | 8/2000 |
| WO | 2004/071818 | 8/2004 |
| WO | 2006132990 | 12/2006 |
| WO | 2007/056849 | 5/2007 |
| WO | 2009/124394 | 10/2009 |
| WO | 2009/124395 | 10/2009 |
| WO | 2009/124401 | 10/2009 |

OTHER PUBLICATIONS

Anonymous "Inftatable Bellows-Box Panel" Research Disclosure, Mason Publications, Hampshire, Great Britain, vol. 374, No. 9 (Jun. 1, 1995).

Canadian Patent Application No. 2,535,661 Notice of Allowance dated Feb. 1, 2010.

(56) References Cited

OTHER PUBLICATIONS

Canadian Patent Application No. 2,535,661 Office Action dated Jan. 20, 2009.
European Patent Application No. 04761769.1 Examination Report dated Mar. 23, 2007.
European Patent Application No. 04761769.1 Communication under Rule 71 (3) EPC dated Jul. 1, 2009.
European Patent Application No. 04761769.1 Decision to Grant dated Nov. 19, 2009.
European Patent Application No. 04761769.1 Supplementary European Search Report dated Nov. 1, 2006.
European Patent Application No. 06771989.8 Supplementary European Search Report dated Feb. 8, 2010.
European Patent Application No. 06771989.8 Examination Report dated May 21, 2010.
European Patent Application No. 06804728.1 Communication under Rule 71 (3) EPC dated Jun. 14, 2010.
European Patent Application No. 06804728.1 Examination Report dated Oct. 27, 2009.
European Patent Application No. 06804728.1 Response to European Examination Report dated Mar. 3, 2010.
European Patent Application No. 06804728.1 Supplementary European Search Report dated Jun. 15, 2009.
International Patent Application No. PCT/CA2004/001605 International Search Report dated Feb. 8, 2005.
International Patent Application No. PCT/CA2006/001862 International Preliminary Report on Patentability dated May 29, 2008.
International Patent Application No. PCT/CA2006/001862 International Search Report and Written Opinion dated Feb. 1, 2007.
International Patent Application No. PCT/CA2009/000475 International Search Report dated Jul. 7, 2009.
International Patent Application No. PCT/CA2009/000476 International Search Report and Written Opinion dated Jul. 28, 2009.
International Patent Application No. PCT/CA2009/000507 International Search Report dated Jul. 14, 2009.
International Patent Application No. PCT/US2006/021507 International Search Report and Written Opinion dated Oct. 26, 2006.
International Patent Application No. PCT/US2006/021507 International Preliminary Report on Patentability dated Dec. 6, 2007.
Japanese Patent Application No. 2006-525586 Office Action dated Apr. 6, 2010.
European Patent Application No. 06771989.8 Examination Report dated Feb. 2, 2011.
U.S. Appl. No. 11/560,473 Office Action dated Mar. 15, 2010.
U.S. Appl. No. 11/560,473 Office Action dated Oct. 22, 2010.
U.S. Appl. No. 11/560,473 Advisory Action dated Jan. 12, 2011.
U.S. Appl. No. 11/915,797 Office Action dated Feb. 18, 2010.
U.S. Appl. No. 11/915,797 Office Action dated Apr. 14, 2010.
U.S. Appl. No. 12/422,389 Office Action dated Mar. 17, 2010.
U.S. Appl. No. 12/422,389 Office Action dated Nov. 8, 2010.
U.S. Appl. No. 12/422,389 Advisory Action dated Jan. 24, 2011.
U.S. Appl. No. 12/422,389 Advisory Action dated Feb. 22, 2011.
Office Action in relation to U.S. Appl. No. 12/955,491, mailed on May 10, 2011.
Japanese Office Action for Application No. 2008-514914 dated Aug. 31, 2011, 6 pages.
U.S. Appl. No. 12/978,139 Office Action dated Jun. 8, 2012.
U.S. Appl. No. 12/937,104 Office Action dated Aug. 15, 2012.
English translation of DE10123207; Publication Date: Jul. 4, 2002; Country: DE; Inventar: Tietz Werner; Assignee: Audi NSU Auto Union AG.
German Patent Application No. 112009000827.5 Office Action dated Apr. 16, 2012 (English Translation and Original).
European Search Report for Application No. 12168676.0 dated Jun. 26, 2012.
U.S. Appl. No. 12/937,096 Office Action dated Aug. 24, 2012.
U.S. Appl. No. 13/100,785 Office Action dated Jun. 28, 2012 (10 pages).
U.S. Appl. No. 13/180,182 Office Action dated Dec. 21, 2012 (9 pages).
U.S. Appl. No. 12/937,100 Office Action dated Dec. 6, 2012 (6 pages).
Office Action from the Korean Intellectual Property Office for Application No. 10-2007-7030970 dated Jan. 17, 2013 (14 pages).
International Search Report and Written Opinion of the International Searching Authority, International Patent Application No. PCT/CA2011/000518, mailed Aug. 11, 2011.
U.S. Appl. No. 12/955,491 Office Action dated Jun. 24, 2011.
Office Action from the United States Patent and Trademark Office for U.S. Appl. No. 13/215,892 dated Apr. 16, 2013 (11 pages).
Office Action from corresponding German Application No. 112009000826.7 dated Aug. 9, 2016 (7 pages).
Office Action from corresponding German Application No. 112009000840.2 dated Aug. 9, 2016 (7 pages).

* cited by examiner

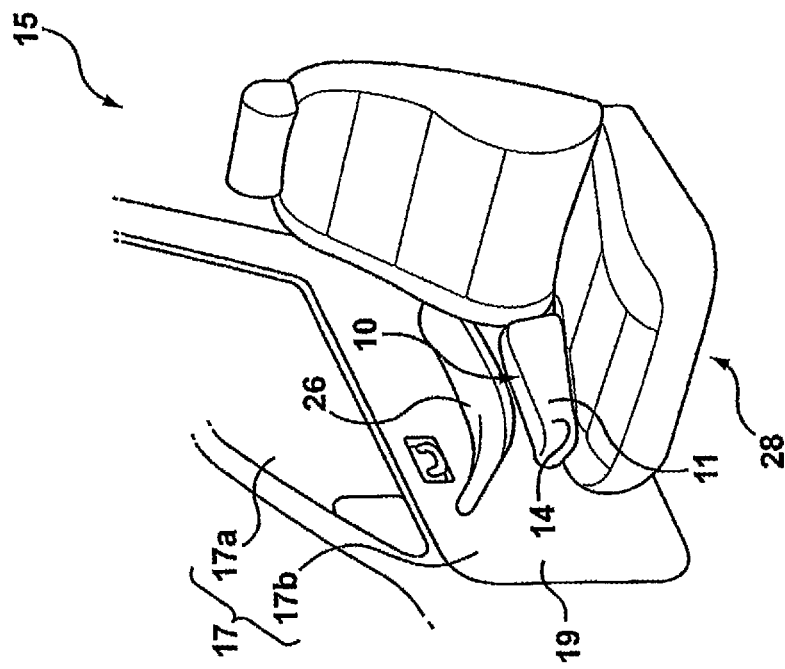
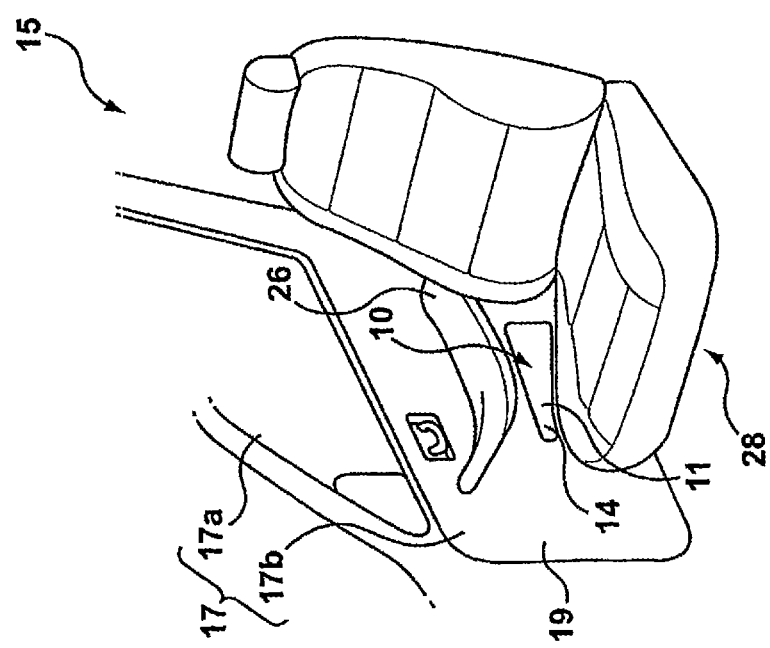

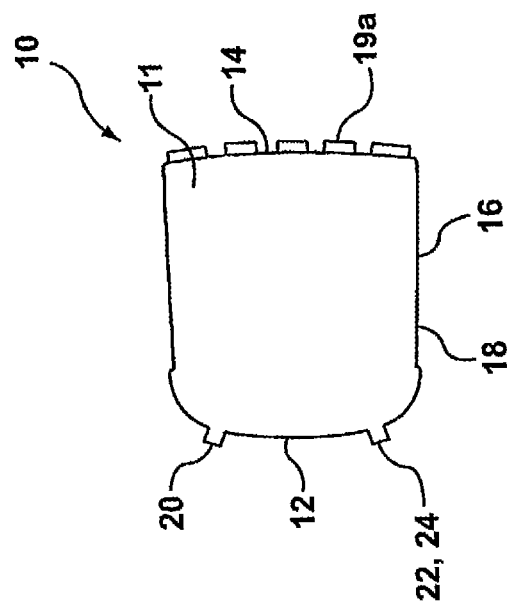
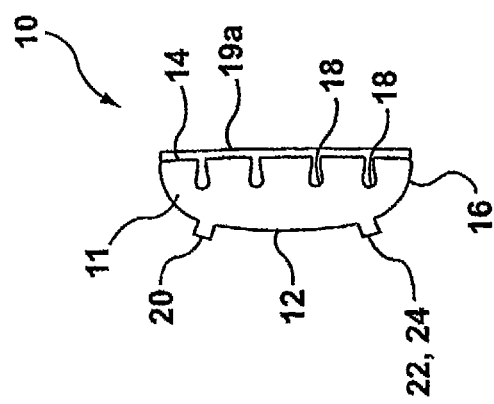
FIG. 2B
FIG. 2A

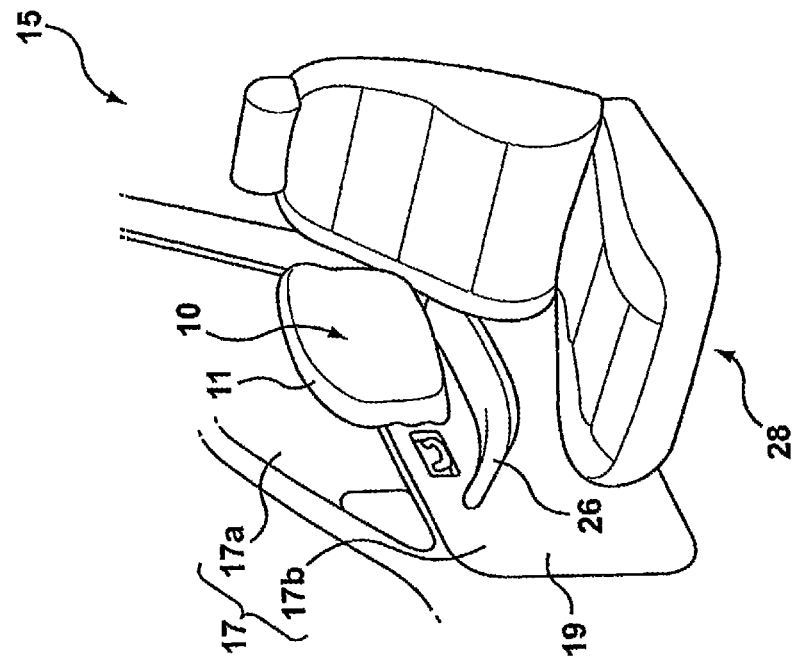
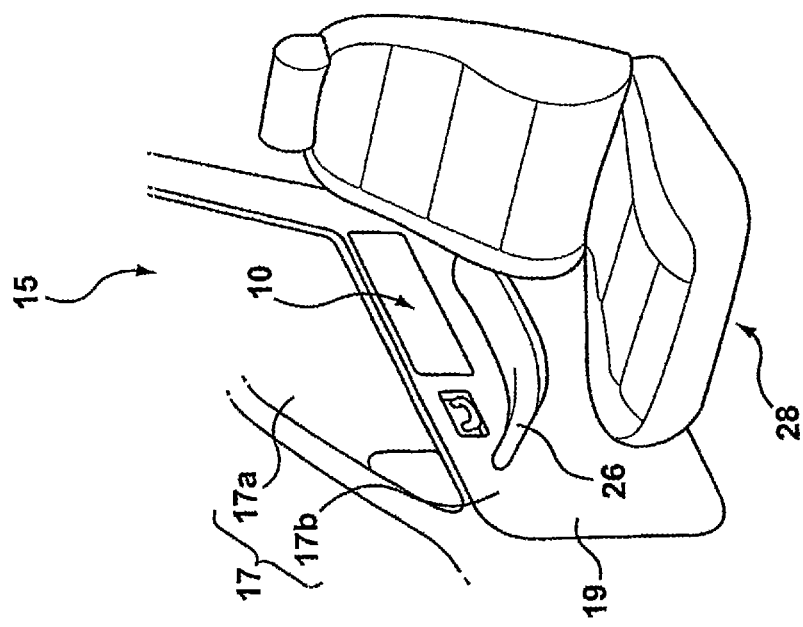

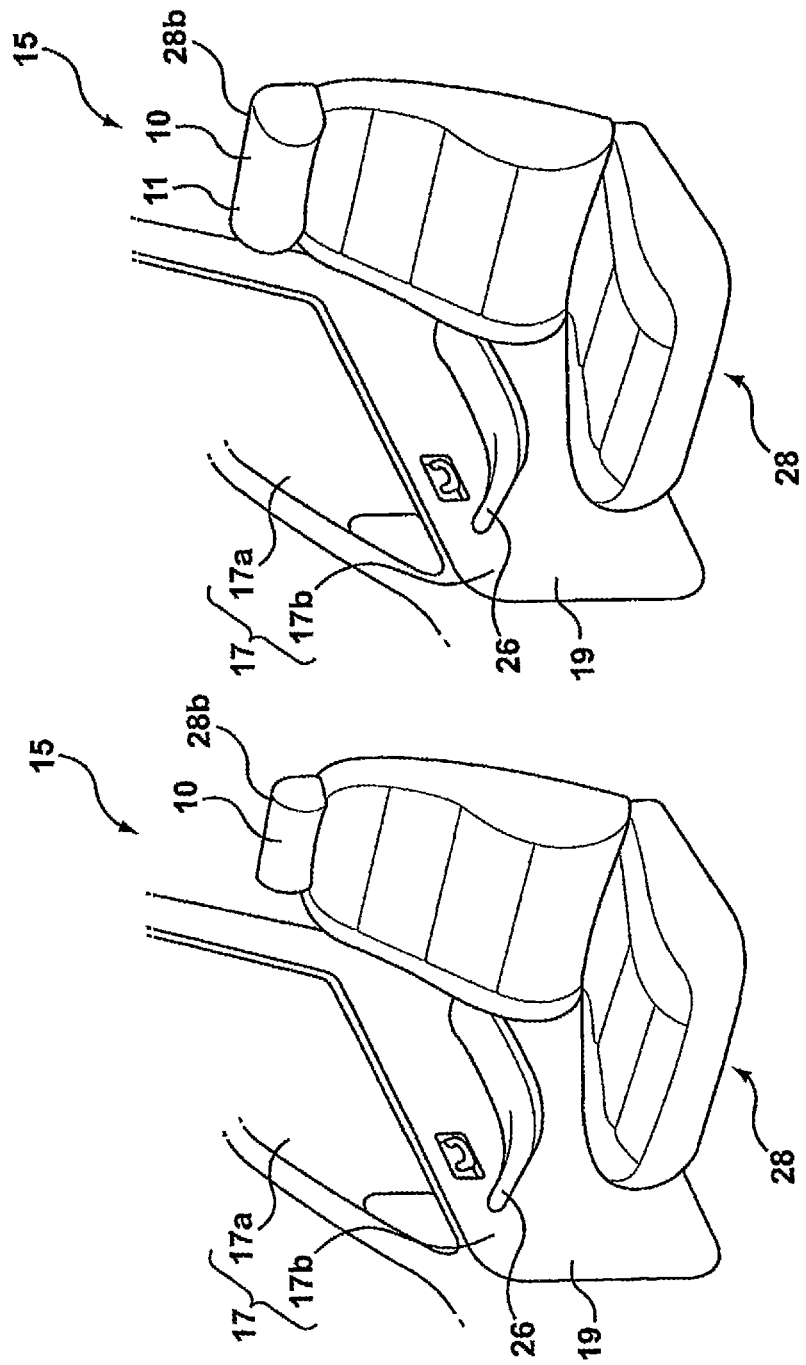

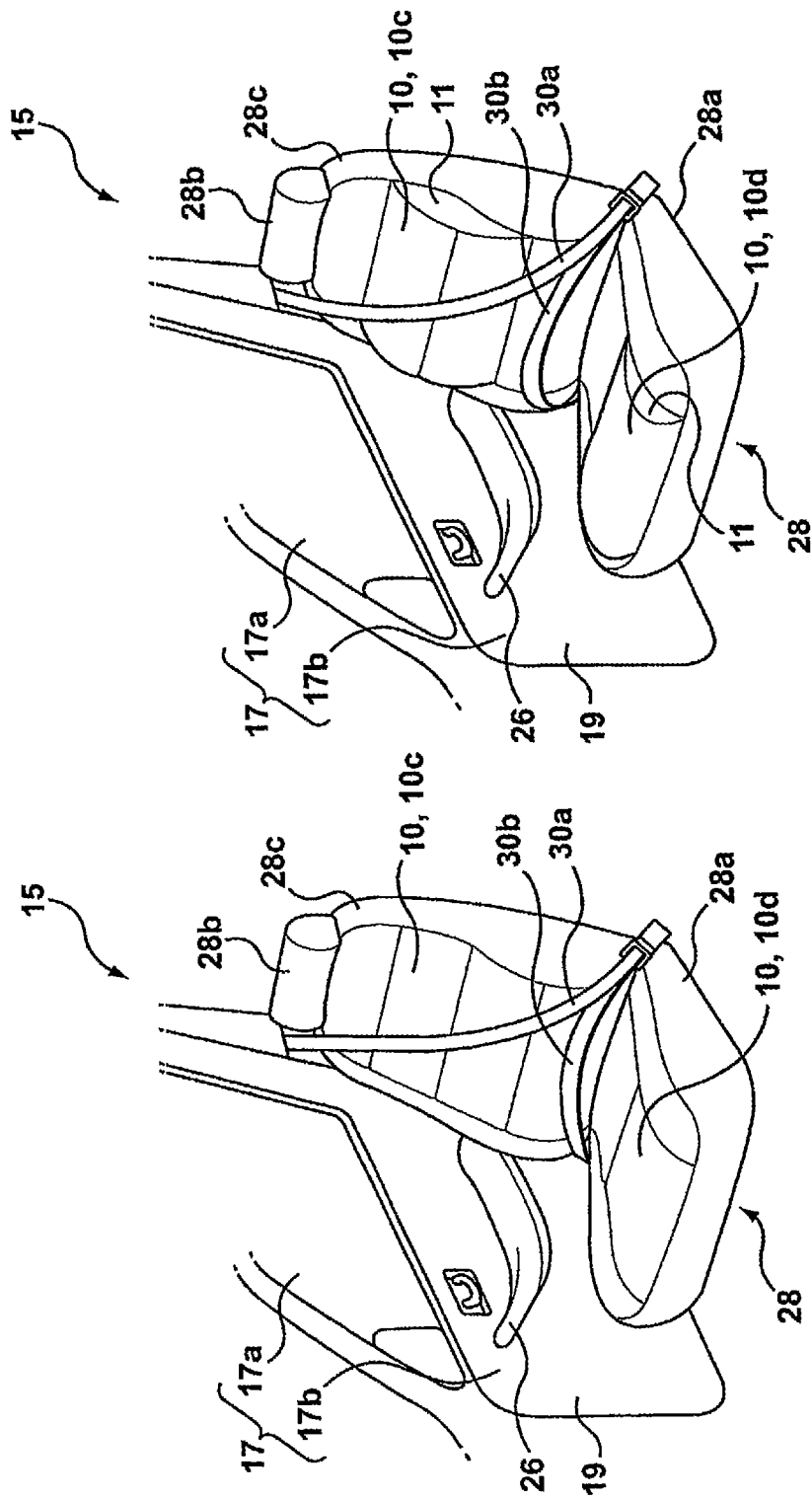

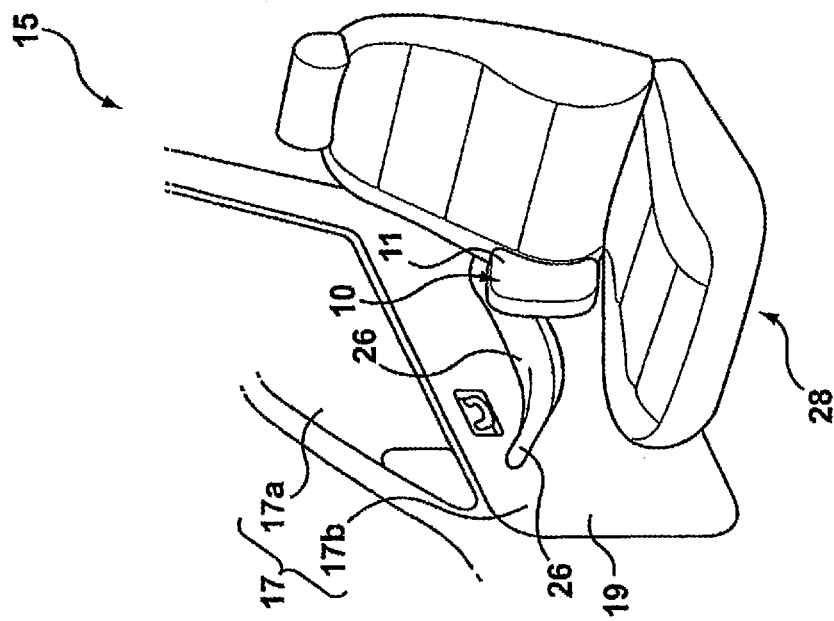
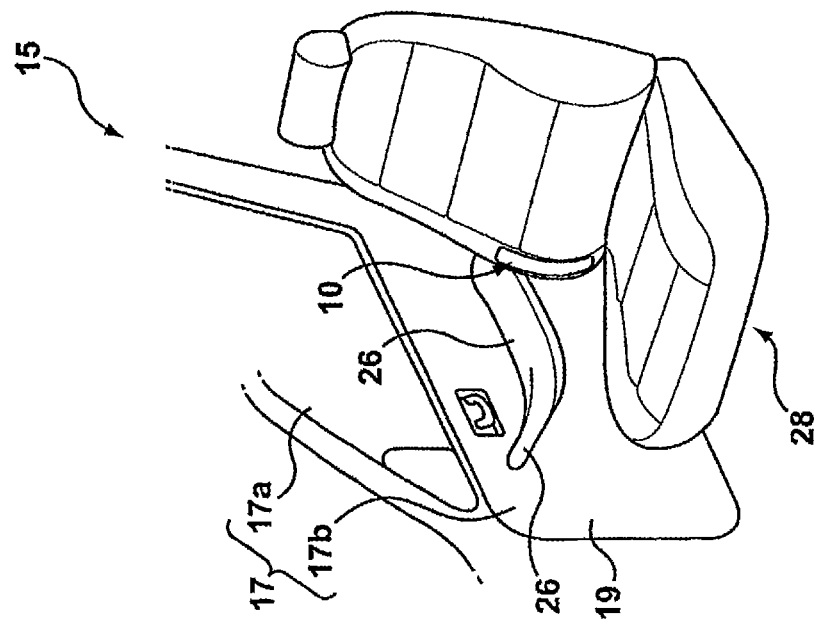

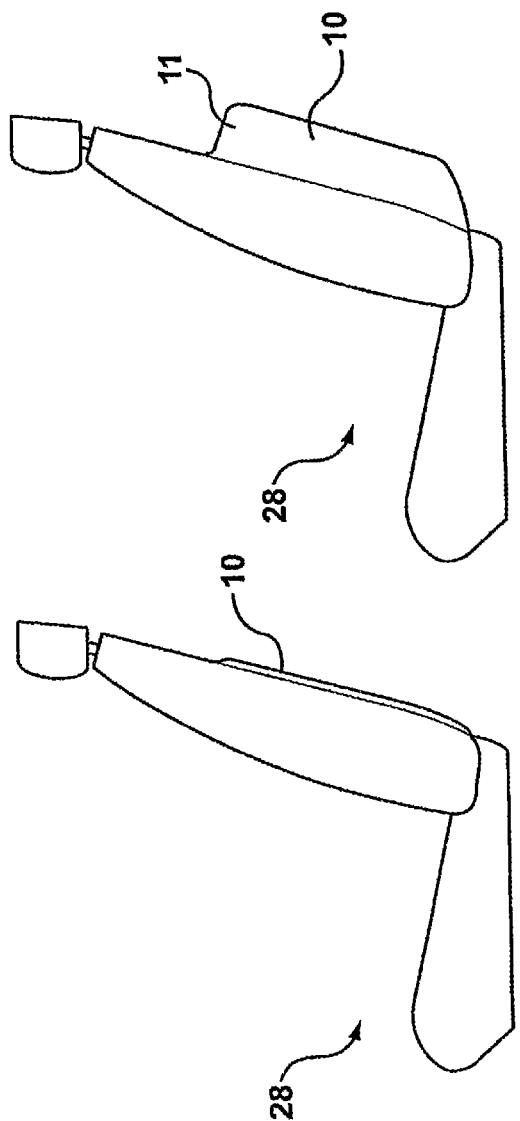

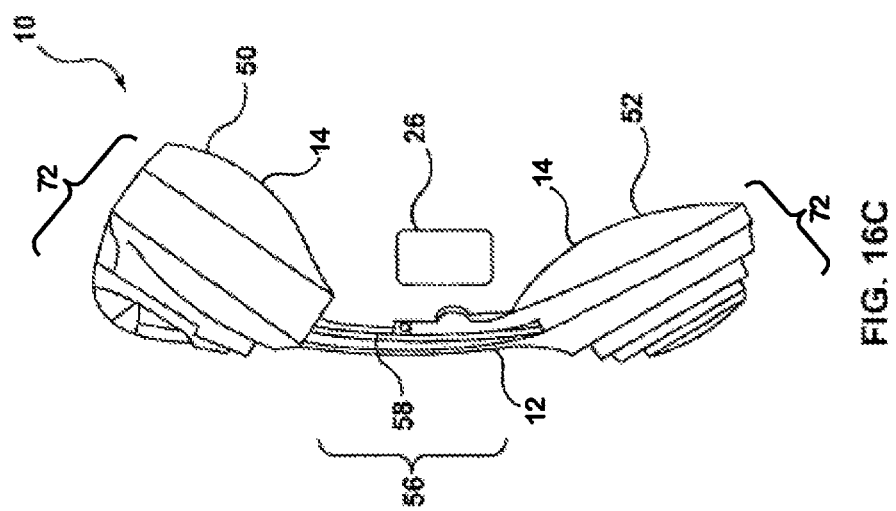

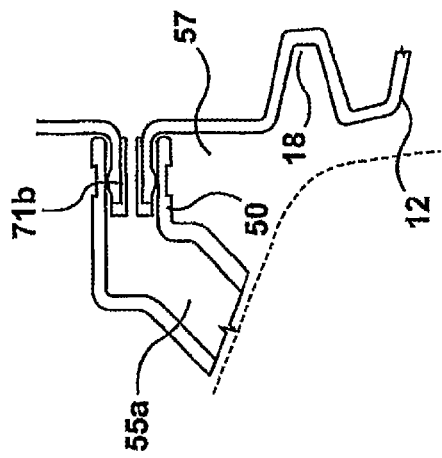
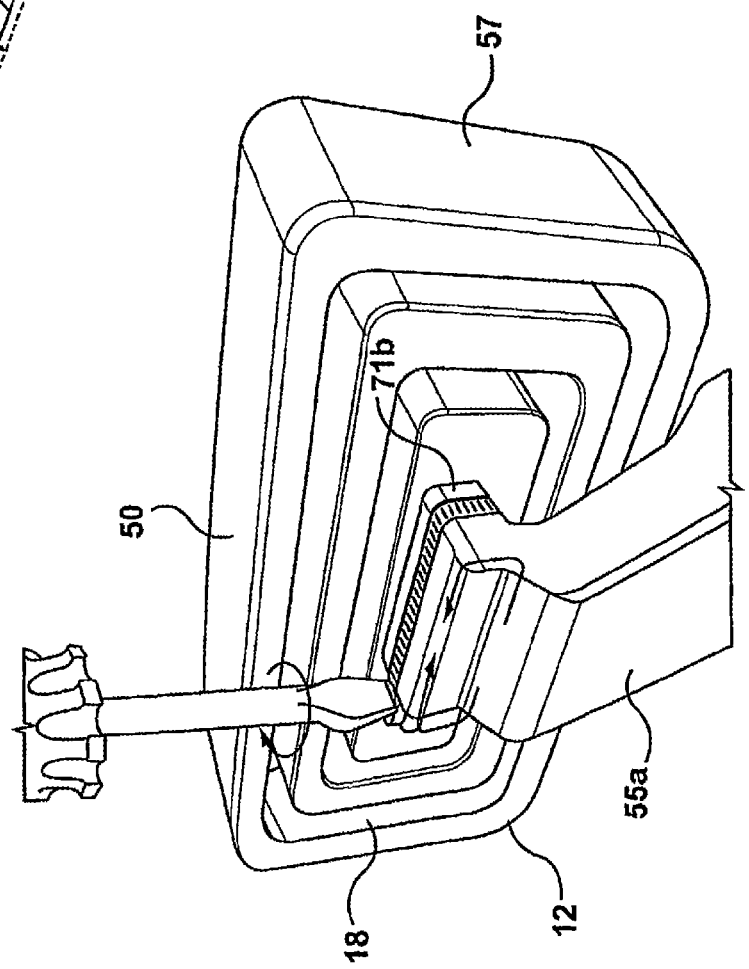

SECTION A-A

ACTIVE BOLSTER

FIELD OF THE INVENTION

The present invention relates generally to protective devices as are often installed in motor vehicles, such as automobiles, and, more particularly, the invention is directed to an inflatable bolster for use in a vehicle.

BACKGROUND OF THE INVENTION

Several types of device have been proposed for protecting vehicle occupants during a crash event. Such devices can be categorized as being either passive devices or active devices.

Passive safety devices deform to absorb energy during a crash event. Passive devices, however, remain in a fixed position during a crash event. Accordingly, there may be a relatively large distance over which the vehicle occupant may accelerate during a crash event before encountering a passive device.

Active safety devices are those that deploy immediately prior to a crash event so that they are positioned relatively close to the vehicle occupants. By reducing the distance between the occupant and the safety device, the occupant has less time to accelerate before encountering the safety device, and therefore is less likely to sustain injury. A typical active safety device incorporates an air bag that inflates prior to a crash event. The air bag is typically a fabric bag that is held in a housing until it is deployed. Air bag devices, however, add complexity and cost to the vehicular subassemblies to which they are added.

It would be advantageous to provide an active safety device that is relatively inexpensive to incorporate into a vehicle.

SUMMARY OF THE INVENTION

In a first aspect, the invention is directed to an active bolster for a vehicle, wherein the bolster includes a hollow main body that is inflatable and is self-supporting in both an inflated and in an uninflated position.

The main body may act directly as, or may have a covering that acts as, a first surface, which forms part of the visible interior of the vehicle.

The main body may replace a structural element of the vehicle, such as a headrest on a vehicle seat, or an armrest on a vehicle door.

The main body may optionally include a vent means for venting pressurized gas contained therein. The vent means may comprise one or more holes of a selected size through the wall of the main body. Alternatively, the vent means may comprise a structure such as a relief valve.

In another aspect, the invention is directed to an inflatable device positioned on a rear-facing surface of a seat in a vehicle, in which the seat is positioned in front of a second seat. The inflatable device is inflatable for inflation during a vehicle crash event to protect an occupant in the second seat.

In yet another aspect, the invention is directed to an inflatable lumbar bolster for inhibiting submarining of a seat-belted occupant in a vehicle seat during a crash event.

In yet another aspect, the invention is directed to an inflatable forward pelvic bolster for inhibiting submarining of a seat-belted occupant in a vehicle seat during a crash event.

In yet another aspect, the invention is directed to a combination of an inflatable lumbar bolster and an inflatable forward pelvic bolster for inhibiting submarining of a seat-belted occupant in a vehicle seat.

In yet another aspect, the invention is directed to an inflatable armrest for vehicle door.

In yet another aspect, the invention is directed to a device for mounting on a door in a vehicle, wherein the device includes an inflatable bolster and an armrest. Wherein the inflatable bolster includes an inflatable, hollow main body. The hollow main body is self-supporting in both an uninflated position and an inflated position. The armrest is integrally connected with the main body portion.

In yet another aspect, the invention is directed to an inflatable device including a plurality of inflatable portions, which are fluidically connected to a single inflator. For example, the inflatable portions may be positioned for inflation above and below an armrest on a door.

In accordance with a first aspect of an embodiment of the invention, there is provided an inflatable side bolster for mounting on a side of a vehicle. The inflatable side bolster comprises i) an expansible hollow interior; ii) an inflator module for inflating the expansible hollow interior; iii) an inner wall for projecting inwardly into the vehicle and away from the side of the vehicle on inflation of the expansible hollow interior; and, iv) an outer wall located between the expansible hollow interior and the side, the outer wall having an attachment portion comprising at least one attachment for attaching the outer wall to a portion of the side of the vehicle, and a peripheral portion bordering the attachment portion. The outer wall is mountable to the portion of the side by the at least one attachment such that the outer wall remains attached to the portion of the side by the at least one attachment during inflation, and the peripheral portion of the outer wall is free to move relative to the portion of the side of the vehicle to facilitate expansion of the expansible hollow interior during inflation.

In accordance with a second aspect of an embodiment of the invention, there is provided a vehicle door comprising a window, a door body adjacent to the window portion, an armrest attached to the door body; and an inflatable bolster. The inflatable bolster comprises i) an expansible hollow portion; ii) an inflator module for inflating the expansible hollow portion; iii) an inner wall for projecting inwardly into the vehicle and away from the door on inflation of the expansible hollow portion; iv) an outer wall located between the expansible hollow portion and the door body, the outer wall having an attachment portion comprising at least one attachment for attaching the outer wall to a portion of the door, and a peripheral portion bordering the attachment portion. The outer wall is mountable to the door body by the at least one attachment such that the outer wall remains attached to the door body by the at least one attachment during inflation, and the peripheral portion of the outer wall is free to move relative to the door body to facilitate expansion of the expansible hollow portion during inflation.

In accordance with a third aspect of an embodiment of the invention, there is provided an inflatable side bolster for a side of a vehicle, the inflatable side bolster comprising i) an expansible hollow interior; ii) an inflator module for inflating the expansible hollow interior; iii) an inner wall for projecting inwardly into the vehicle and away from the side of the vehicle on inflation of the expansible hollow interior; and, iv) an outer wall located between the expansible hollow interior and the side, the outer wall having at least one attachment for attaching the outer wall to a portion of the side of the vehicle.

In accordance with a fourth aspect of an embodiment of the invention, there is provided a vehicle seat comprising a body-supporting surface, a back surface opposite to the body-supporting surface; and an inflatable bolster. The inflatable bolster comprises i) an expansible hollow portion; ii) an inflator module for inflating the expansible hollow portion; and, iii) an occupant-side wall for projecting away from the seat on inflation of the expansible hollow portion to displace at least one of the body-supporting surface and the back surface.

In accordance with a fifth aspect of an embodiment of the invention, there is provided a vehicle floor bolster comprising i) an expansible hollow portion; ii) an inflator module for inflating the expansible hollow portion; and, iii) a foot-supporting surface for supporting a pair of feet before inflation and for projecting upward on inflation of the expansible hollow portion to raise the pair of feet.

In accordance with a sixth aspect of an embodiment of the invention, there is provided a vehicle rollover bar bolster for mounting on a vehicle rollover bar. The vehicle roll-over bar bolster comprises i) an expansible hollow interior; ii) an inflator module for inflating the expansible hollow interior; iii) a radially outer wall for projecting outwardly away from the vehicle roll-over bar on inflation of the expansible hollow interior; and, iv) a radially inner wall for attachment to the vehicle rollover bar, the radially inner wall being located between the expansible hollow interior and the vehicle rollover bar.

In accordance with a seventh aspect of an embodiment of the invention, there is provided a vehicle roof bolster comprising i) an expansible hollow portion; ii) an inflator module for inflating the expansible hollow portion; and, iii) a roof surface for projecting away from a vehicle roof on inflation of the expansible hollow portion.

In accordance with a eighth aspect of an embodiment of the invention, there is provided a vehicle pillar bolster comprising i) an expansible hollow portion; ii) an inflator module for inflating the expansible hollow portion; and, iii) a pillar surface for projecting into the vehicle on inflation of the expansible hollow portion.

BRIEF DESCRIPTION OF THE DRAWINGS

The present invention will now be described by way of example only with reference to the attached drawings, in which:

FIG. 1A is a perspective view of an active bolster in accordance with a first embodiment of the present invention, mounted on a door of a vehicle below the armrest, and in an uninflated position;

FIG. 1B is a perspective view of the active bolster shown in FIG. 1A in an inflated position;

FIG. 2A is a sectional side view of an active bolster in accordance with another embodiment of the present invention, in an uninflated position;

FIG. 2B is a sectional side view of the bolster shown in FIG. 2A, in an inflated position;

FIGS. 3A and 3B are perspective views of a bolster mounted on a vehicle door above the armrest, in accordance with yet another embodiment of the present invention;

FIGS. 6A and 6B are perspective views of a headrest-mounted bolster in accordance with yet another embodiment of the present invention;

FIGS. 8A and 8B are perspective views of a lumbar bolster in combination with a forward pelvic bolster, in accordance with yet another embodiment of the present invention;

FIGS. 9A and 9B are perspective views of a seat-mounted bolster, in accordance with yet another embodiment of the present invention;

FIGS. 10A and 10B are perspective views of a bolster mounted on the rear face of a seat, in accordance with yet another embodiment of the present invention;

FIG. 16C is a side view of the bolster shown in FIG. 16A, in an inflated condition, near an armrest;

FIG. 18A is a side view of an alternative connection between the inflatable body and the gas channel as contained in the bolster shown in FIG. 16E in accordance with a further embodiment of the invention;

FIG. 18B is a perspective view of the connection shown in FIG. 18A;

DETAILED DESCRIPTION OF THE INVENTION

Examples of inflatable bolsters include the structures illustrated in U.S. Pat. Nos. 6,032,978, 6,203,057, and 6,578,867, the entire contents of which are incorporated herein by reference.

Reference is made to FIGS. 1A, 1B, 1C and 1D, which illustrate an active bolster 10 in accordance with a first embodiment of the present invention. The active bolster 10 is positioned on a door 17 of a vehicle 15, and deploys to protect a vehicle occupant 13 (see FIG. 1C) during a crash event and in particular during a side impact incurred by the vehicle 15 (see FIG. 1A). The vehicle 15 may be any applicable vehicle, such as an automobile, an SUV (sport-utility vehicle), or a pick-up truck. The active bolster 10 can be configured to absorb energy to protect the upper torso, thorax, lower torso, head or combinations of these regions of the occupant 13 (FIG. 1C) during a crash event.

Figure 1D:
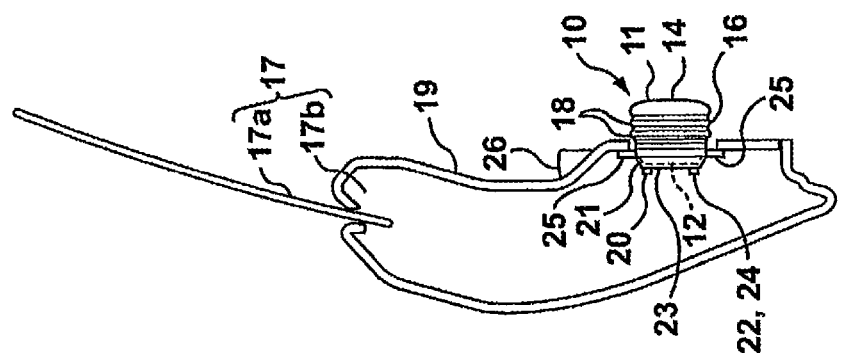
FIG. 1D is a sectional side view of the bolster in the inflated position shown in FIG. 1B.
Figure 1C:
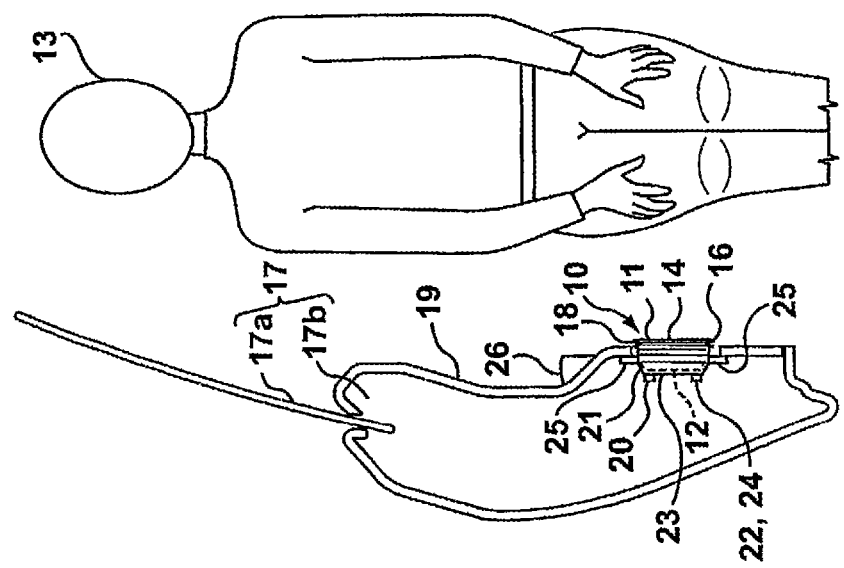
FIG. 1C is a sectional side view of the bolster in the uninflated position shown in FIG. 1A.

Referring to FIG. 1C, the bolster 10 includes a hollow main body 11 and an attachment means 21. The hollow main body 11 is inflatable and is self-supporting in both an inflated position (FIG. 1C) and in an uninflated position (FIG. 1D). The main body 11 has an outside wall 12, an inside wall 14 and a side wall 16 that connects the outside and inside walls 12 and 14. The outside wall 12 of the bolster 10 is the wall that faces towards the outside of the vehicle 15. In the embodiment shown in FIGS. 1A-1D, the outside wall 12 is captured by the attachment means 21.

The inside wall 14 is the wall that faces the interior of the vehicle 15. In the bolster's folded state, as shown in FIGS. 1A and 1C, the inside wall 14 may form part of the interior door panel 19 of the vehicle 15. In such a case, the inside wall 14 may be provided with a suitable finish, e.g., in accordance with the design theme for the rest of the vehicle interior. Thus, the inside wall 14 may act as a first surface, i.e., a surface that is directly exposed to view by a vehicle occupant 13.

Alternatively, a suitable interior door panel segment, such as a fabric panel, may be attached to the inside wall 14. Thus, the inside wall 14 can act as a support for holding a door panel segment, thereby replacing the support that would have been required in the absence of the bolster 10.

The hollow main body 11 includes one or more pleats 18 thereon, which may be positioned around the sidewall 16, as shown in FIGS. 1C and 1D. The pleats 18 permit the expansion of the hollow main body 11 upon the introduction of a pressurized gas therein. The number, stiffness and position of the pleats 18 can be selected depending upon the selected direction of expansion of the bolster 10. The pleats 18 may be configured to control the amount and direction of expansion of the main body 11, so that the inside wall 14, and the overall body 11, may be positioned in a selected position relative to the vehicle occupant 13 to provide selected energy absorption for selected regions of the occupant's body.

The pleats 18 need not be positioned on the sidewall 16. For example, referring to FIGS. 2A and 2B, the pleats 18 may be provided on the inside wall 14. In the case where they are provided on the inside wall 14, it may be desirable for aesthetic reasons for the inside wall 14 to be covered by a suitable interior door panel segment 19a to hide the pleats 18 from view by the vehicle occupants.

The pleats 18 may be created as U-shaped portions that extend between ridges on the main body 11.

As another alternative, the main body 11 may be provided with a selected shape and may be folded or otherwise put into its uninflated position. The body 11 may be folded over on itself whereby at least some of the folds do not constitute pleats.

It is alternatively possible to incorporate other means for controlling the direction and degree of expansion that occurs for the main body 11. For example, one or more tethers (not shown) may be provided, each tether connecting between a point on the main body 11 and a structural member on the vehicle 15. Such tethers could work optionally in combination with pleats on the main body 11.

As another alternative, the main body 11 may have a wall thickness that varies over its surface. The main body 11 may be provided with a relatively thinner wall where expansion is desired, and may be provided with a relatively thicker wall where expansion is to be inhibited. By controlling the positions of the regions of thicker and thinner walls, the degree and direction of expansion may be controlled for the main body 11. In such an embodiment, it will be appreciated that expansion of the main body 11 will occur as a result of plastic deformation of the wall, in particular where the wall is relatively thinner. It will be appreciated, however, that some plastic deformation will take place during expansion for embodiments incorporating pleats 18.

Other means for controlling the direction and degree of expansion of the main body 11 may alternatively be employed either alone or in combination with each other and with those described above. For example, tabs (not shown) may be provided at selected points on the main body 11, which engage the vehicle structure. Such engagement could be used to fix the position of one part of the main body 11 while permitting expansion in another part of the main body 11, thereby causing the main body 11 to expand around a corner, for example. Such tabs may be made to break away at a selected level of force. Alternatively, hinges may be provided instead of tabs, depending on the specific application.

The hollow body 11 is preferably made from a polymeric material such as a polypropylene-based material. The main body 11 may be formed of a blow-molded polypropylene-based or other polyolefin material. The material of construction may be a recyclable material. It is optionally possible that different portions of the main body 11 may be made from different materials. It is further possible that such use of different materials, may be used to assist in controlling the deployment pattern of the main body 11. Using a thermoplastic for the bolster 10 provides flexibility for matching vehicle interior designs.

An inflation means (not shown) is provided for inflating the main body 11. Generally, the inflation means will include a source of inflating gas, typical of those used in vehicle air bags. This will be connected to an activation source. Advantageously, the bolster 10 may be manufactured in a plastic blow molding operation. The blow molding operation is particularly convenient for making closed, hollow articles. The hollow body 11 defines an internal chamber, which may be a closed chamber. If the chamber is a closed chamber, then the chamber may confine the expanding gas sufficiently to cause expansion of the hollow main body 11 upon activation without the need for an internal bladder. Optionally, the inflatable bolster 10 can include an internal bladder, in which case the chamber need not be sufficiently gas tight. If an internal bladder is provided, then preferably the outside wall 14 will include access means to position the appropriate bladder within the chamber and to position the means for supplying the pressurized gas to the bladder upon activation.

Referring to FIGS. 1C and 1D, the hollow body 11 includes an inlet 20 for receiving the inflation gas. The inflation gas may be provided by any suitable inflation device, such as an inflators used on air bag systems. If the bolster 10 includes multiple chambers therein, the inlet 20 may branch into several internal conduits, each of which connects the inlet to an internal chamber.

The hollow body 11 may optionally include a venting means 22. The venting means 22 limits pressure build up within the main body 11 during bolster deployment and provides a selected force/pressure behavior for the bolster 10 during deployment and occupant impact with the bolster 10. The venting means 22 can be used to provide a slower (ie. less abrupt) deceleration for the occupant 13, subsequent to impact between the occupant 13 and the bolter 10, thereby reducing the likelihood of injury to the occupant 13. Additionally, after deployment of the bolster 10, the venting means 22 permits the main body 11 to deflate to provide space for the occupant 13 to move around or egress the vehicle 15.

The venting means 22 may be, for example, one or more vent holes 24, as shown, or may alternatively be some other suitable venting means, such as a relief valve (not shown). In an embodiment where vent holes 24 are utilized, the vent holes 24 are made adequately small to permit the build up of pressure in the main body 11 to cause it to expand during deployment of the bolster 10.

The attachment means 21 are used to attach the bolster 10 to the vehicle structure. The attachment means 21 may comprise a support member 23, which has mounting tabs 25 thereon. The support member 23 captures the outside wall 12 and a portion of the sidewall 16. The mounting tabs 25 may include fastener apertures (not shown) so that fasteners (not shown) may be used to removably mount the bolster 10 to the vehicle structure. This permits the bolster 10 to easily be removed and replaced when appropriate. By capturing the outside wall 12, the support member 21 prevents expansion of the hollow body 11 towards the outside of the vehicle 15, so that when the main body 11 is inflated, expansion of the main body 11 occurs towards the interior of the vehicle 15. The support member 21 and tabs 23 may be metallic, or may be made from a polymeric material, depending on the forces expected to be incurred and the room available.

It is alternatively possible to have the mounting tabs 23 be formed directly on the main body 11. For example, the entire outside end of the main body 11 could be made suitable thick-walled for strength and for resistance to outwardly directed expansion during inflation. The tabs 23 could be formed directly thereon during a molding process.

The fasteners used to attach the bolster 10 to the vehicle structure may include trim clips, rivets, screws or other mechanical fasteners, or alternatively adhesive, depending on the application.

The bolster 10 is shown as being mounted on the door 17 below the armrest, shown at 26. During a crash event, pressurized air (or any suitable pressurized gas) is introduced into the hollow main body 11 from the inflator through the inlet 20. The pressurized gas causes the main body 11 to expand. In the embodiment shown in FIGS. 1A-1D, the main body 11 is configured to expand directly inwardly into the interior of the vehicle 15, towards the upper legs and hip region of the vehicle occupant 13 seated in the seat 28 adjacent the door 17. In this way, if the vehicle occupant 13 is accelerated by the crash event towards the door 17, he/she will encounter the bolster 10 earlier than he/she would have encountered the door 17, had the bolster 10 not been present. As a result, the occupant 13 will have reached a lower velocity when encountering the bolster 10 than he/she would have reached if he/she had been free to accelerate all the way to the door 17. Additionally, the bolster 10 provides the occupant 13 with a greater distance over which to decelerate. As a result of the lower velocity and the greater deceleration distance, the occupant 13 is less likely to sustain injury from the crash event. If the bolster 10 is provided with the vent means 22, the deceleration can be even better controlled, and the occupant 13 can be at even lower risk of sustaining injury from the crash event.

Reference is made to FIGS. 3A and 3B, in which the bolster 10 is shown as being mounted to the door 17 above the armrest 26. In this embodiment, the bolster 10 may be configured to extend inwardly into the interior of the vehicle 15 towards the occupant 13 and to present an inflated form that engages the upper torso, ie. the shoulder region, of the occupant 13, protecting the occupant from collision with both the door body, shown at 17b and the lower region of the door window. The door window is shown at 17a.

In a crash event, the shoulder region of an occupant 13 may move farther towards the vehicle door 17 than the hip region of the occupant 13 does, since the shoulder region may be less securely held in place by a seat belt than the hip region. Thus, while protecting the hip region of the occupant 13 is valuable, it is also valuable to protect the shoulder region of the occupant 13 from colliding with the door 17. The bolster 10 shown in FIGS. 3A and 3B accomplish this. Additionally, by deploying to protect the shoulder region of the occupant 13, the bolster 10 in FIGS. 3A and 3B also protects the head of the occupant 13 by making it less likely that the head of the occupant will collide with the door 17.

Figure 4B:
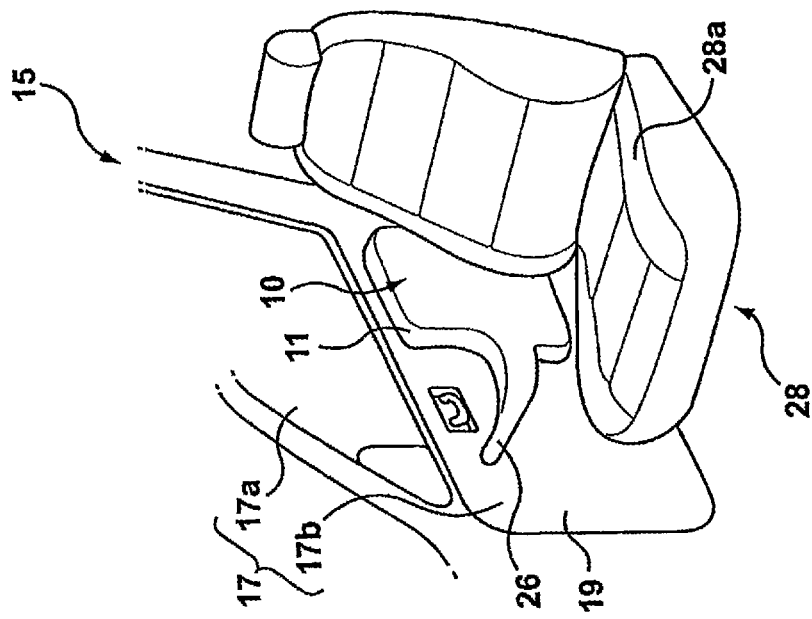
FIGS. 4A and 4B are perspective views of a bolster and armrest integrally connected together in accordance with another embodiment of the present invention.
Figure 4A:
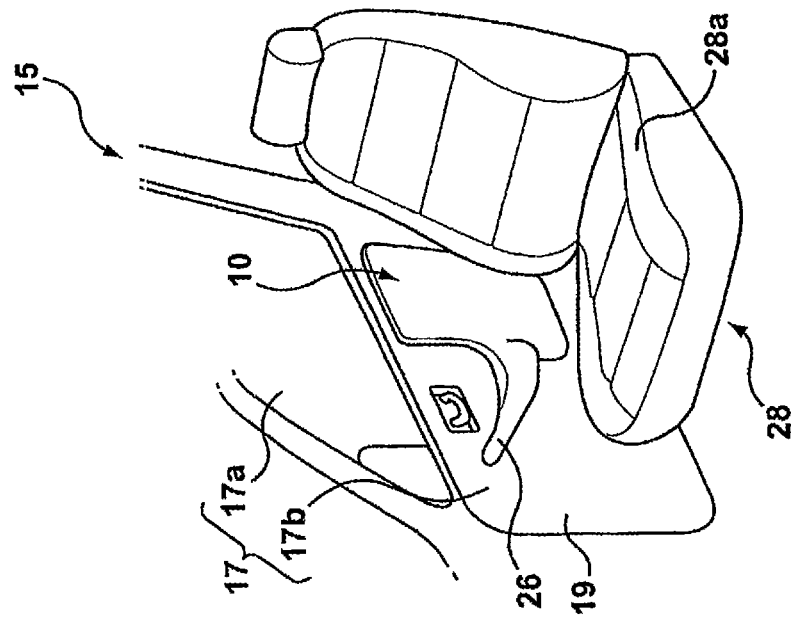

Reference is made to FIGS. 4A and 4B, in which the bolster 10 is shown as being positioned aft of the armrest 26. In this position, the bolster 10 can cover a relatively large vertical stretch along the door body 17b, without interference from the armrest 26. The bolster 10 could be configured to cover substantially the entire distance between the top of the door body 17b, and the seat bottom portion, shown at 28a. The bolster 10 can be configured to extend directly inwardly towards the occupant 13 and thereby protect a relatively large portion of the occupant's torso.

Reference is made to FIGS. 16A, 16B, 16C and 16D, which show the bolster 10 including a first bolster portion 50 and a second bolster portion 52. The first and second bolster portions 50 and 52 are fluidically connected to an inflator, shown at 54, by fluid conduits 55a and 55b. Thus, in this embodiment, the bolster 10 includes two separate inflatable bolster portions 50 and 52, both of which are inflated by a single gas inflator 54. The outer wall 12 of the bolster portions 50 and 52 comprise peripheral portions 72, which extend relative to the door during inflation. This is advantageous in that the assembly may be less expensive than two separate bolster assemblies and two separate inflators. The bolster portions 50 and 52 are shown in their uninflated condition in FIGS. 16A and 16B, and are shown in their inflated condition in FIGS. 16C and 16D.

Additionally, it will be noted that dividing the bolster 10 into the first and second bolster portions 50 and 52 which are inflated by a common inflator 54, permits the bolster 10 to cover substantially all of the height of the door body (not shown in FIGS. 16A, 16B, 16C and 16D) above and below the armrest 26 (shown in FIGS. 16B and 16C), while avoiding pushing the armrest 26 itself into the interior of the vehicle. To facilitate this, the bolster 10 may be made relatively stiffer and uninflatable in the region 56 of the bolster 10 that is proximate the armrest 26. Stiffening the region 56 inhibits the bolster 10 from urging the armrest 26 into the vehicle interior during inflation of the bolster 10. Additionally, mounting plates 58 and 60 may be provided in the stiffened region 56, which contain mounting apertures 62, 64, 66 and 68, which are used to mount the bolster 10 to the vehicle's structure. Mounting the bolster 10 in the region 58 that is proximate the armrest 26 further assists in inhibiting the bolster 10 from urging the armrest 26 into the vehicle interior during bolster inflation. The mounting plates 58 and 60 may be made from any suitable material, such as a polymeric material that can be joined to the rest of the bolster 10 with suitable structural integrity.

Figures 16A, 16B:
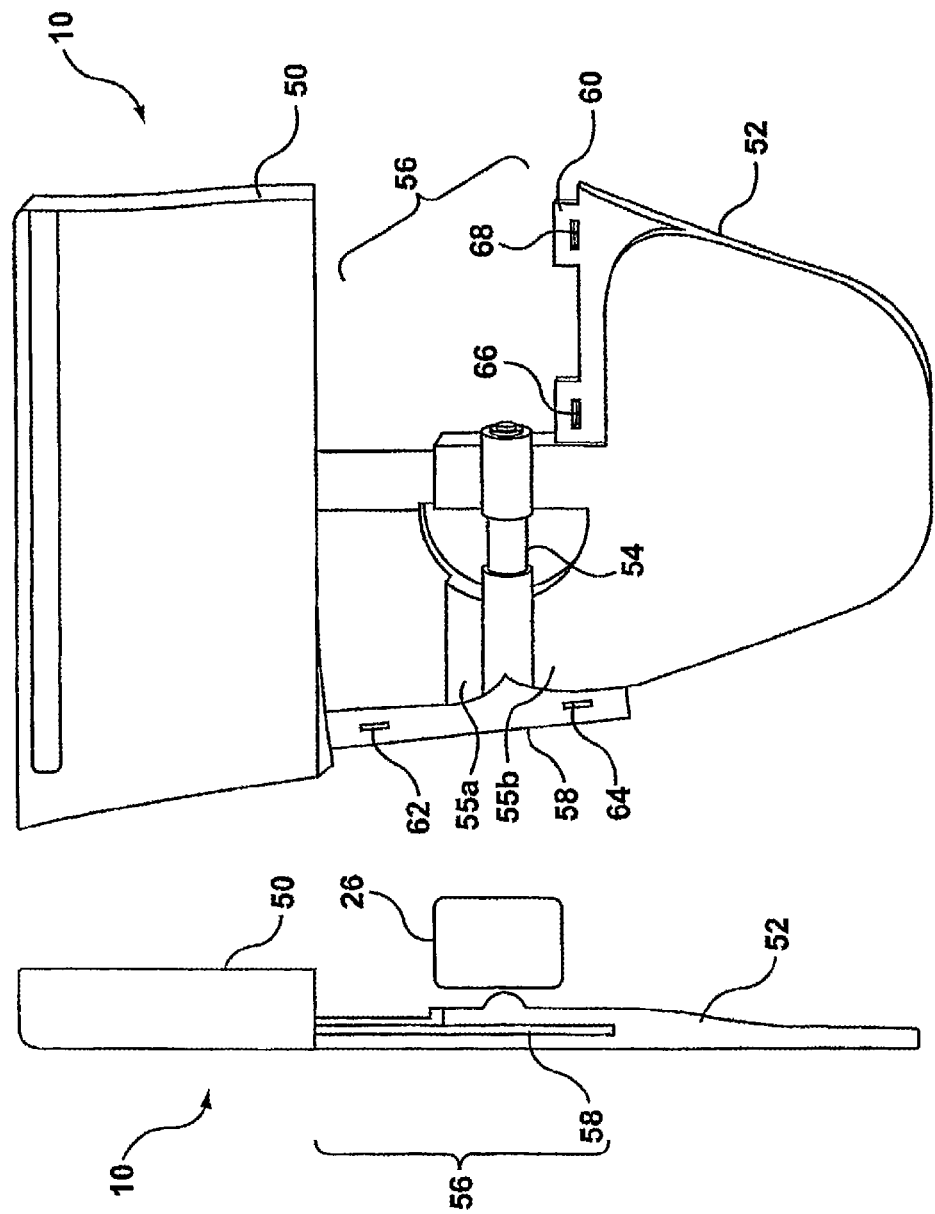
FIG. 16A is an elevation view of a bolster in accordance with yet another embodiment of the present invention, in an uninflated condition.
FIG. 16B is a side view of the bolster shown in FIG. 16A, in an uninflated condition, near an armrest.
Figure 16D:
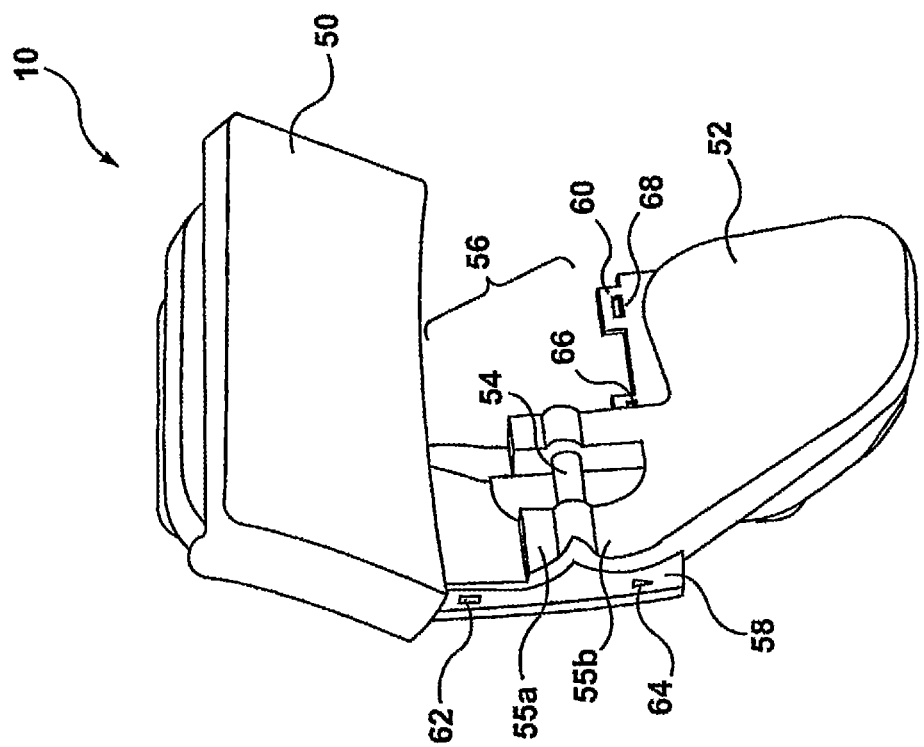
FIG. 16D is a perspective view of the bolster shown in FIG. 16A in an inflated condition.
Figure 16E:
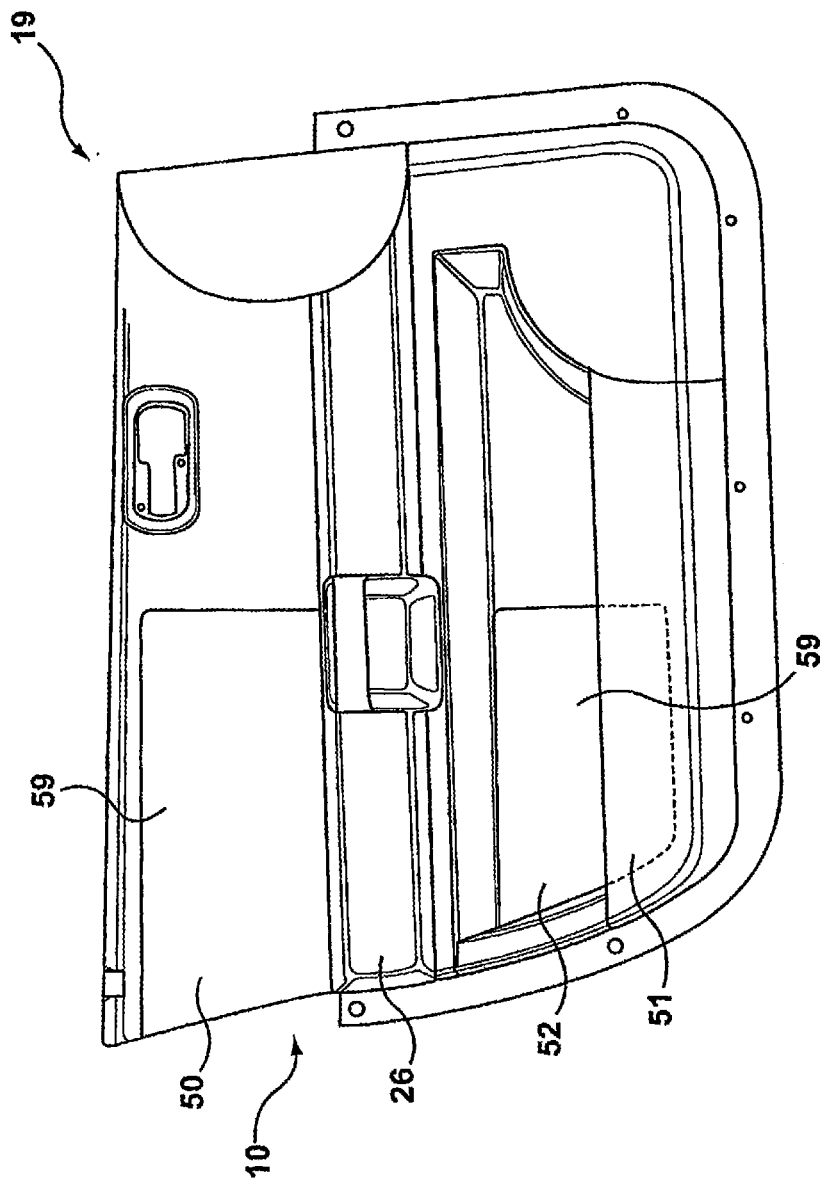
FIG. 16E is a front view of an active side bolster in accordance with a further embodiment of the invention in an uninflated condition, positioned in an interior door panel.
Figure 16F:
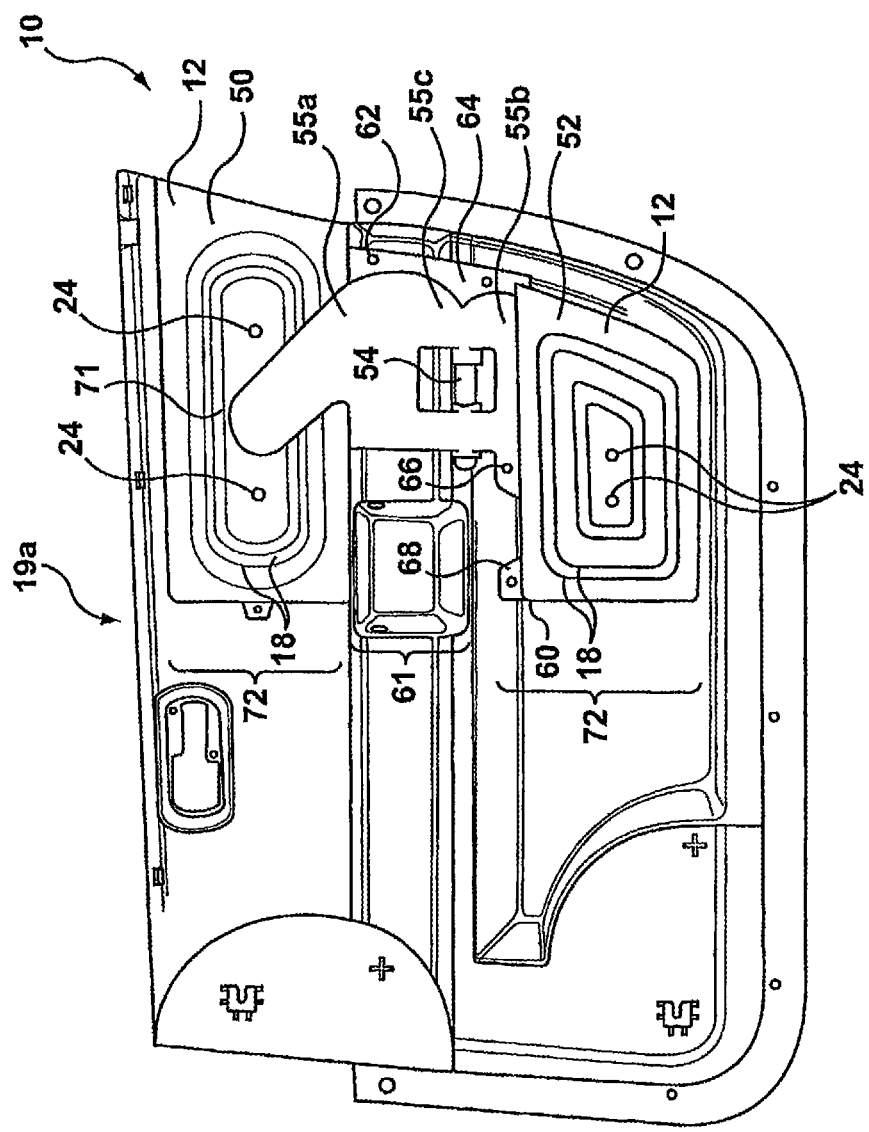
FIG. 16F is a front view of the outside of the bolster shown in FIG. 16E in an uninflated condition, positioned in an interior door panel.

Referring to FIG. 16E, there is illustrated in a front view an exposed interior door panel 19 showing side bolster 10 comprising the first 50 and second 52 bolster portions in accordance with a further embodiment of the invention. The bolster portions 50 and 52 are shown positioned in relation to the armrest 26 and a detachable interior panel portion 51 of the exposed interior door panel 19. The detachable interior panel portion 51 can be released from the door panel 19 by the inflation of the second bolster portion 52. For clarity, analogous elements between side bolster 10 of FIGS. 16A-16D, and side bolster 10 of FIGS. 16E-16I, are denoted by the same numerals. In FIGS. 16E and 16F, the bolster portions 50 and 52 are shown in their un-inflated condition.

Referring to FIG. 16F, the unexposed side of the interior door panel is shown in an interior view, and the side bolster 10 is shown with the first bolster portion 50 and the second bolster portion 52 positioned above and below the armrest 26 respectively. The inflator 54 is positioned close to the armrest 26, and the connection 71 between the fluid conduit 55a and the first bolster portion 50 is shown. A relatively non-expansive attachment portion 61, including mounting plates 58 and 60, and mounting apertures 62, 64, 66 and 68 is also shown. The required strength and stiffness of the attachment portion 61 may be obtained by increasing the thickness of the wall surrounding the hollow interior of the attachment portion 61 appropriately to resist deformation due to the increased air pressure within the hollow interior that causes inflation of the bolster portions 50 and 52. The hollow interior of attachment portion 61 also houses the inflator module 54, which inflates both the first 50 and second 52 bolster portions. The attachment portion 61 is bordered by a peripheral portion 72.

The first 50 and second 52 bolster portions are fluidly connected to the inflator module 54 by fluid conduits 55a and 55b respectively. The junction 55c between fluid conduits 55a and 55b comprises a "V" shaped hollow interior. The relative proportions and orientation of the "V" shaped junction 55c are designed to direct an appropriate portion of the inflation gas into the first 50 and second 52 bolster portions to ensure proper inflation. The outer wall 12 of each bolster portion 50,52 contains pleats 18 to allow for the peripheral portion of the outer wall 12 of the bolster portions 50,52 to extend relative to the door during inflation.

The first 50 and second 52 bolster portions may include a vent hole 24. A vent hole 24 limits the pressure build up within the bolster 10 during deployment and provides a selected force/pressure behaviour for the bolster 10 during deployment. A vent hole 24 can be used to provide a slower deceleration for the vehicle occupant, subsequent to contact between the occupant and the bolster 10, thereby reducing the likelihood of injury to the occupant. Additionally, a vent hole 24 may permit the first 50 and second 52 bolster portions to deflate after deployment to provide space for the occupant to egress the vehicle. A vent hole 24 may be made adequately small to permit the build up of pressure within the bolster 10 to cause it to expand properly during impact.

Figure 16G:
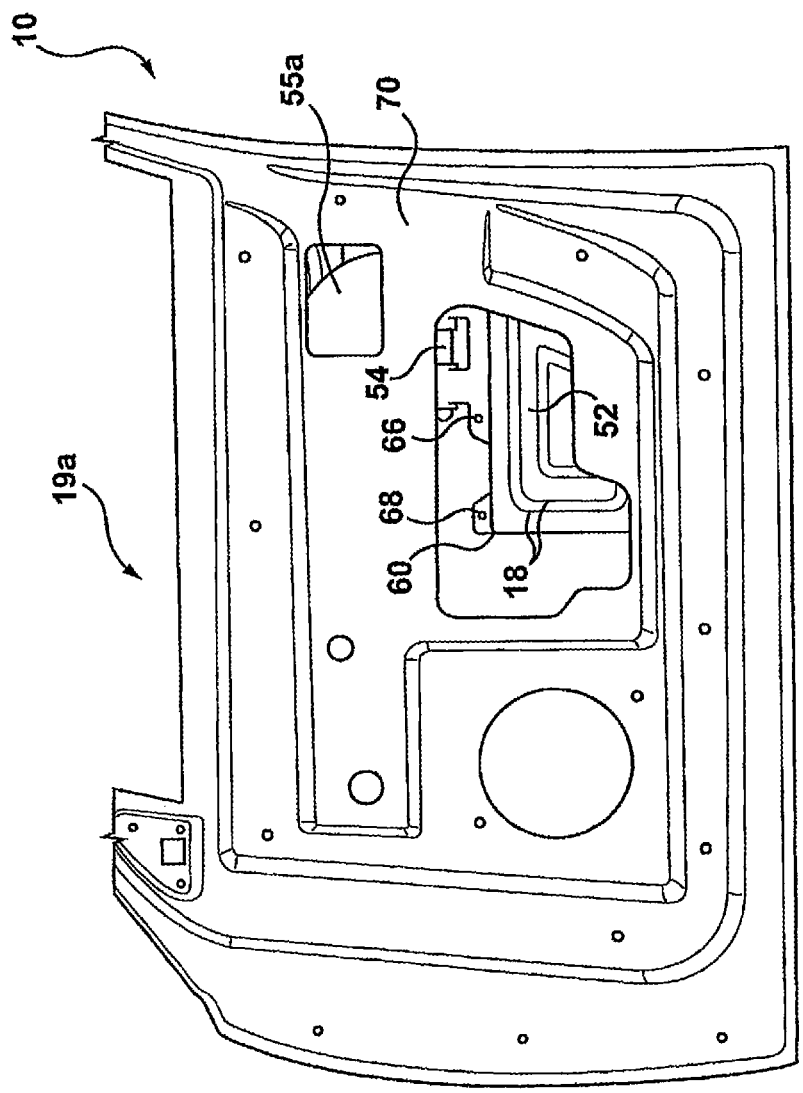
FIG. 16G is a front view of the outside of the bolster shown in FIG. 16E in an uninflated condition, positioned in an interior door panel, with door sheet metal shown in the foreground.

Referring to FIG. 16G, the interior side of the door panel 19a and the second bolster portion 52 are shown with the door panel metal support structure 70 in the foreground. The metal support structure 70 has a portion cut away to illustrate the location of the inflator 54 and second bolster portion 52 pleats 18 and the relative position of the mounting plate 60 and mounting apertures 66 and 68 with respect to the door panel metal support structure 70.

Figure 16H:
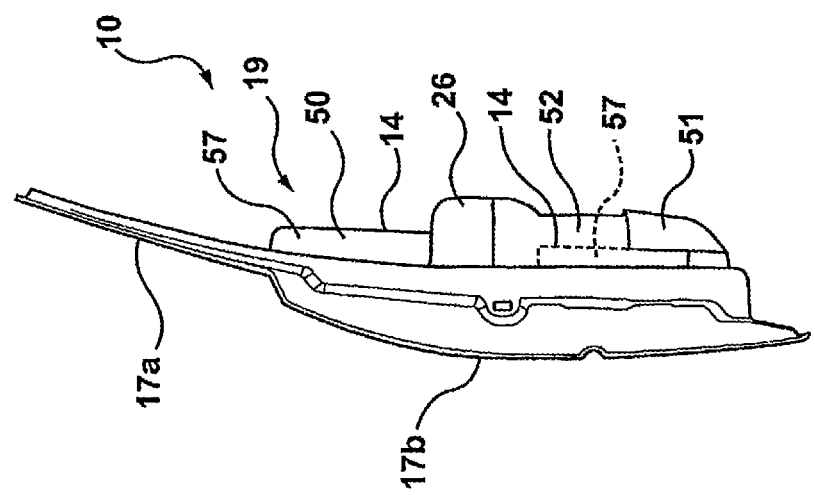
FIG. 16H is a side view of the bolster shown in 16E in an uninflated condition, positioned in an interior door panel.

Referring to FIG. 16H, the first 50 and second 52 bolster portions are shown in a side view in relation to the vehicle door body 17b, the vehicle door window 17a, the interior door panel 19, the armrest 26, and the detachable interior panel portion 51. The first 50 and second 52 bolster portions are shown in an un-inflated condition. In this condition, expansible hollow interior 57 of each bolster portion 50, 52 is uninflated.

Figure 16I:
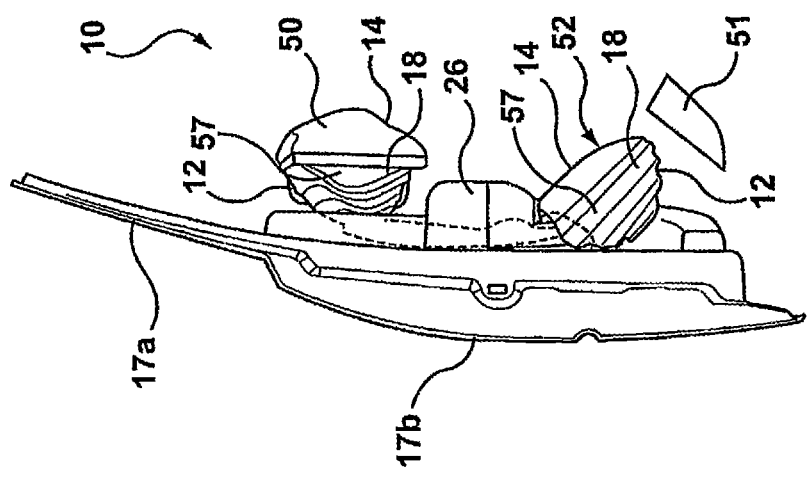
FIG. 16I is a side view of the bolster shown in 16E in an inflated condition, positioned in an interior door panel.

Referring to FIG. 16I, the side view of the side bolster 10 of FIG. 16H is repeated, with the side bolster shown in the inflated condition. As shown, both the first bolster portion 50 and the second bolster portion 52 can deploy into the vehicle interior around the armrest 26 to protect the shoulder and pelvic regions of the vehicle occupants 13 respectively. The detachable interior door panel 51 can be displaced, as shown in FIG. 16I by the inflation of the expansible hollow portion 57 of the second bolster portion 52. The expansion of the bolster portions 50, 52 involves movement of the inside wall 14 into the vehicle's interior and movement of the peripheral portion of the outside wall 12 away from the vehicle door body 17b and window 17a. The peripheral portion of the outside wall 12 may also extend along the dimension of the door body, so that, for example, bolster portion 50 may partly cover the window. The direction and extent of this displacement is affected by the design and number of pleats 18 contained in the outside wall 12 of the bolster.

The exposed surface of both the first bolster portion 50 and the second bolster portion 52 can be finished or covered suitably to act as a normal exposed surface or first surface in door-mounted embodiments, such as the embodiment shown in FIGS. 16E, 16F, 16G, 16H and 16I.

As described above, the side bolster 10 comprises an expansible hollow interior 57, an inflator 54 for inflating the expansible hollow interior 57, and an inside wall 14 or first wall for projecting inwardly into the vehicle and away from the sides of the vehicle on inflation of the expansible hollow interior 57 to protect the vehicular occupants 13.

Figure 17A:
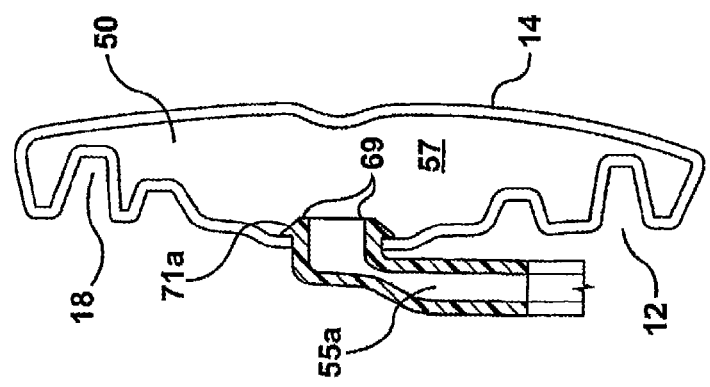
FIG. 17A is a side view of a connection between the inflatable body and the gas channel as contained in the bolster shown in FIG. 16E in accordance with a further embodiment of the invention.
Figure 17B:
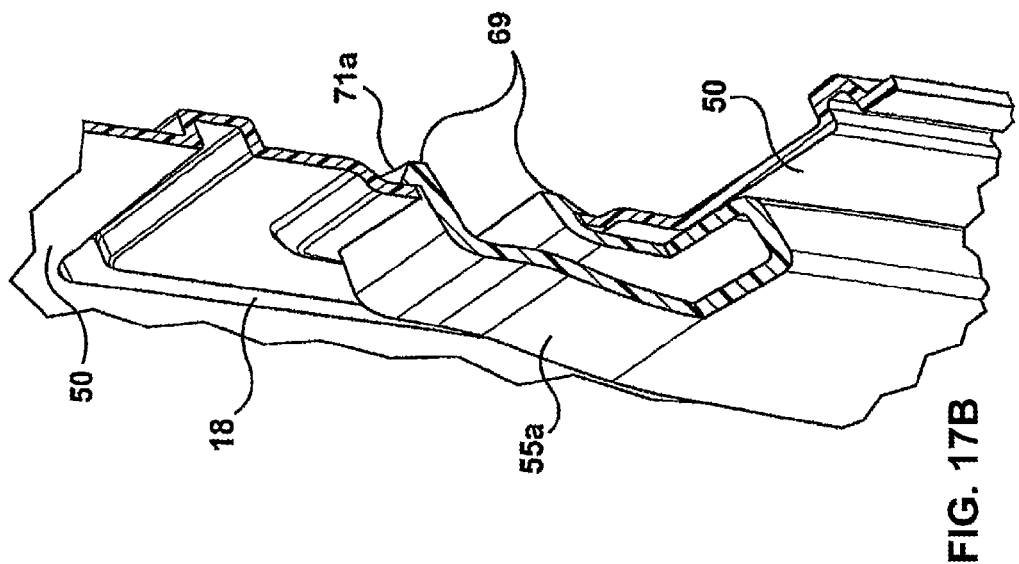
FIG. 17B is a perspective view of the connection shown in FIG. 17A.

Reference is made to FIG. 17A, which shows a sectioned side view of a snap-in connection 71*a* used between the fluid conduit 55*a* and the outside wall 12 of a bolster portion 50 in an embodiment of the invention. During assembly, the opening of the fluid conduit 55*a* is aligned with the appropriately sized opening in the outside wall 12 of the first bolster portion 50. External pressure is then applied to the fluid conduit 55*a* forcing the conduit into the bolster portion 50. The angled shape of the fluid conduit tabs 69 allow for the conduit to be relatively easily inserted into the outside wall of the bolster portion 50, but create significant resistance preventing the conduit from subsequently being removed from the outside wall 12 of the bolster portion 50. Once installed, the fluid conduit 55*a* creates fluid communication between the inflator 54 (not shown in FIG. 17A or 17B) and the expansible hollow interior 57 of the bolster portion 50. The connection 71*a* between the fluid conduit 55*a* and the outside wall 12 of the bolster portion 50 is surrounded by expansion pleats 18 which facilitate movement and inflation of the bolster portion 50. Referring to FIG. 17B, the embodiment of the snap-in connection 71*a* is shown in a sectioned perspective view relative to the fluid conduit 55*a* and the outside wall 12 of a bolster portion 50.

FIGS. 18A and 18B show an alternate means for attaching the fluid conduit 55*a* to the outside wall 12 of the bolster portion 50 to create a fluid connection 71*b* between the inflator 54 (not shown in FIGS. 18A and 18B) and the expansible hollow interior 57 of the bolster portion 50. Reference is made to FIG. 18A, which shows a sectioned side view of a ferrule and gear clamp connection 71*b* used between the fluid conduit 55*a* and the first bolster portion 50 in an embodiment of the invention. The ferrule and gear clamp connection 71*b* is an alternate means of securing the fluid conduit 55*a* to the bolster portion 50 to the means shown in FIGS. 17A and 17B. Referring to FIG. 18B, the embodiment of the ferrule and gear clamp connection 71*b* is shown in a perspective view. This view shows the relative positions of the fluid conduit 55*a*, the outside wall 12 of the first bolster portion 50, and the expansion pleats 18.

Figure 19A:
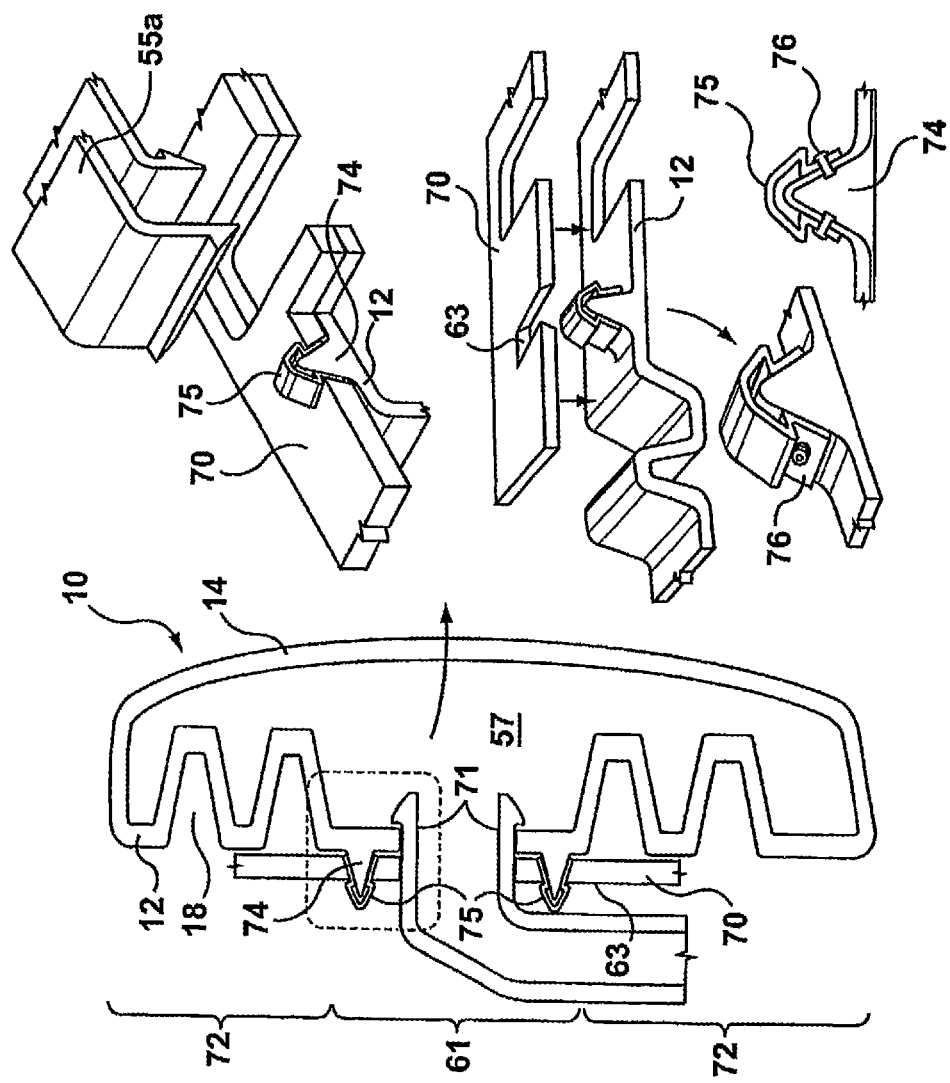
FIGS. 19A, 19B and 19C show sectional and perspective side views of alternative means to fasten and secure an embodiment of an active side bolster to a vehicle support structure.

Reference is made to FIG. 19A which shows a means to fasten a particular embodiment of the bolster 10 to the door panel metal support structure 70 in accordance with an embodiment of the invention. In this embodiment, the outside wall 12 of the bolster 10 comprises integral bolster mounting tabs 74, which are of an appropriate thickness and height to provide the required tensile strength and other desired mechanical properties to secure the bolster 10 to the structure 70 both before and during inflation. The integral bolster mounting tabs are positioned within the attachment portion 61, between the pleats 18 on the outer wall 12 of the bolster 10 and the connection 71 between the bolster 10 and the fluid conduit 55*a*. The connections between the bolster 10 and the door panel metal support structure 70 within the attachment portion 61 of the bolster outer wall 12 remain in place during inflation of the expansible chamber 57. Additional frangible fasteners (not shown) may be used to detachably attach any of the peripheral portions 72 of the outer wall 12 of the bolster, including the expansion pleats 18, to the door panel metal support structure 70 while the bolster is in its uninflated configuration. Fasteners within the peripheral portions 72 of the bolster outer wall 12 can be released by inflation of the expansible chamber 57 so as to not prevent the outer wall 12 from moving relative to the side of the vehicle during inflation.

The particular attachment means shown in FIG. 19A comprises fastening clips 75 that are placed over the integral bolster mount tabs 74. The fastening clips 75 are affixed to the integral bolster mounting tabs 74 by rivets 76. This design is advantageous in that the integral bolster mounting tabs 74 are formed during the initial molding of the bolster 10 and the fastening clips 75 can be manufactured separately and then easily affixed to the bolster 10 via the rivets 76 prior to the bolster 10 being installed in the vehicle. Upon affixing the required fastening clips 75 to the integral bolster mounting tabs 74, the bolster can be positioned relative to the door panel metal support structure 70 and aligned with the predetermined fastening locations 63 within said structure. With the fastening clips 75 properly aligned with the fastening locations 63, pressure can be applied to the bolster portion 50 forcing the fastening clips 75 into the fastening locations 63 and creating a snap-fit connection between the outer wall 12 of the bolster 10 and the door panel metal support structure 70. This connection means can be implemented at the appropriate number of fastening locations 63 as required to produce the desired strength of mechanical connection between the bolster 10 and the door panel metal support structure 70.

Figure 19B:
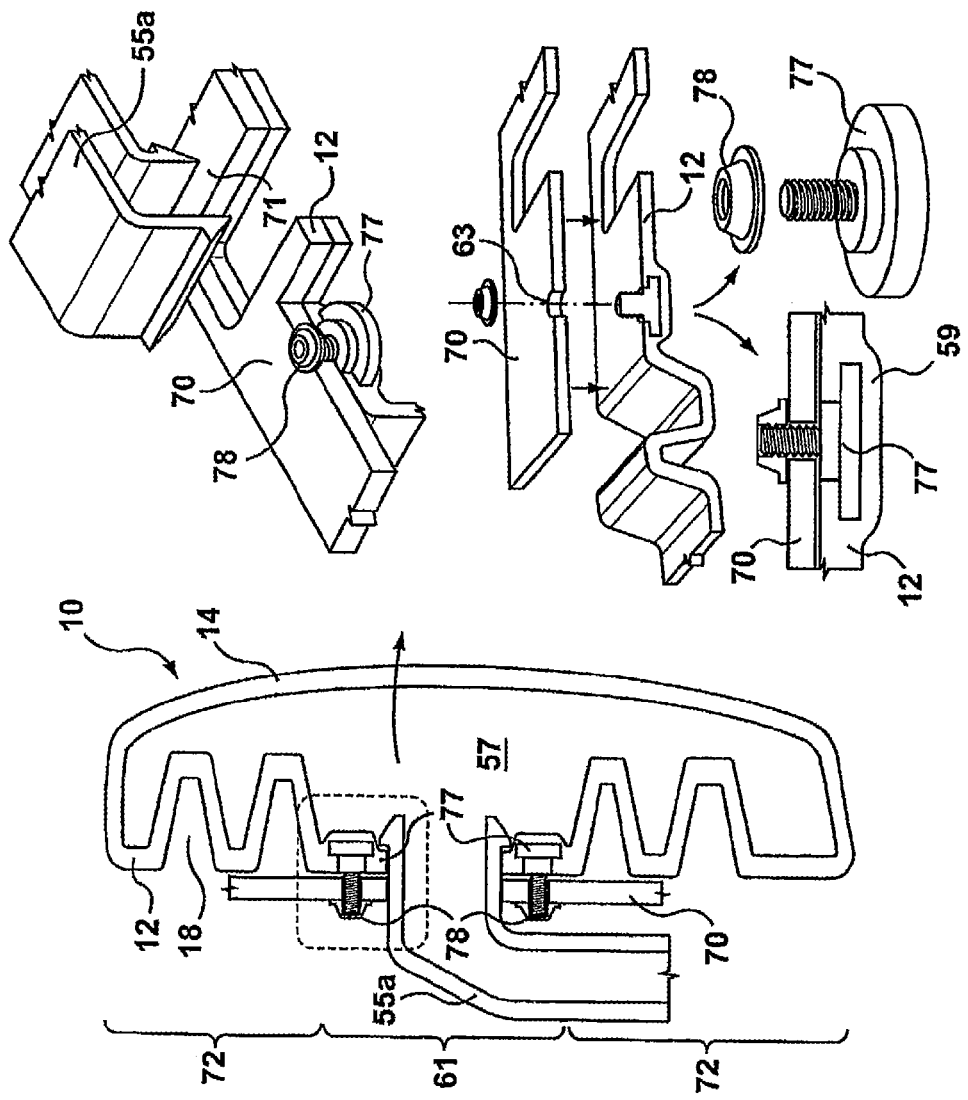

Reference is made to FIG. 19B, which shows another embodiment of a means to fasten the outer wall 12 of an expansible chamber 57 to the door panel metal support structure 70. In this embodiment, the outside wall 12 of the active support bolster 10 comprises insert apertures 59 appropriately sized to receive mounting stud inserts 77, which are of an appropriate thickness and size to provide the required tensile strength and other desired mechanical properties. The insert apertures 59 are positioned within the attachment portion 61, between the expansion pleats 18 on the outer wall 12 of the bolster 10 and the connection 71 between the expansible chamber 57 and the fluid conduit 55*a*. Additional frangible fasteners (not shown) may be used to detachably attach any of the peripheral portions 72 of the outer wall 12 of the bolster, including the expansion pleats 18, to the door panel metal support structure 70 while the bolster is in its uninflated condition. Fasteners within the peripheral portions 72 of the bolster outer wall 12 can be released by inflation of the expansible chamber 57 so as to not prevent the outer wall 12 from moving relative to the side of the vehicle during inflation.

The particular attachment means embodied in FIG. 19B comprises mounting stud inserts 77 that are secured in the bolster 10 and inserted through the fastening locations 63 in the door panel metal support structure 70. Fastening nuts 78, with a diameter appropriately larger than that of the fastening location openings 63, are then threaded onto the studs and tightened until the desired level of mechanical compression is achieved. This connection means can be implemented at the appropriate number of fastening locations 63 as required to produce the desired strength of mechanical connection between the bolster 10 and the door panel metal support structure 70.

Figure 19C:
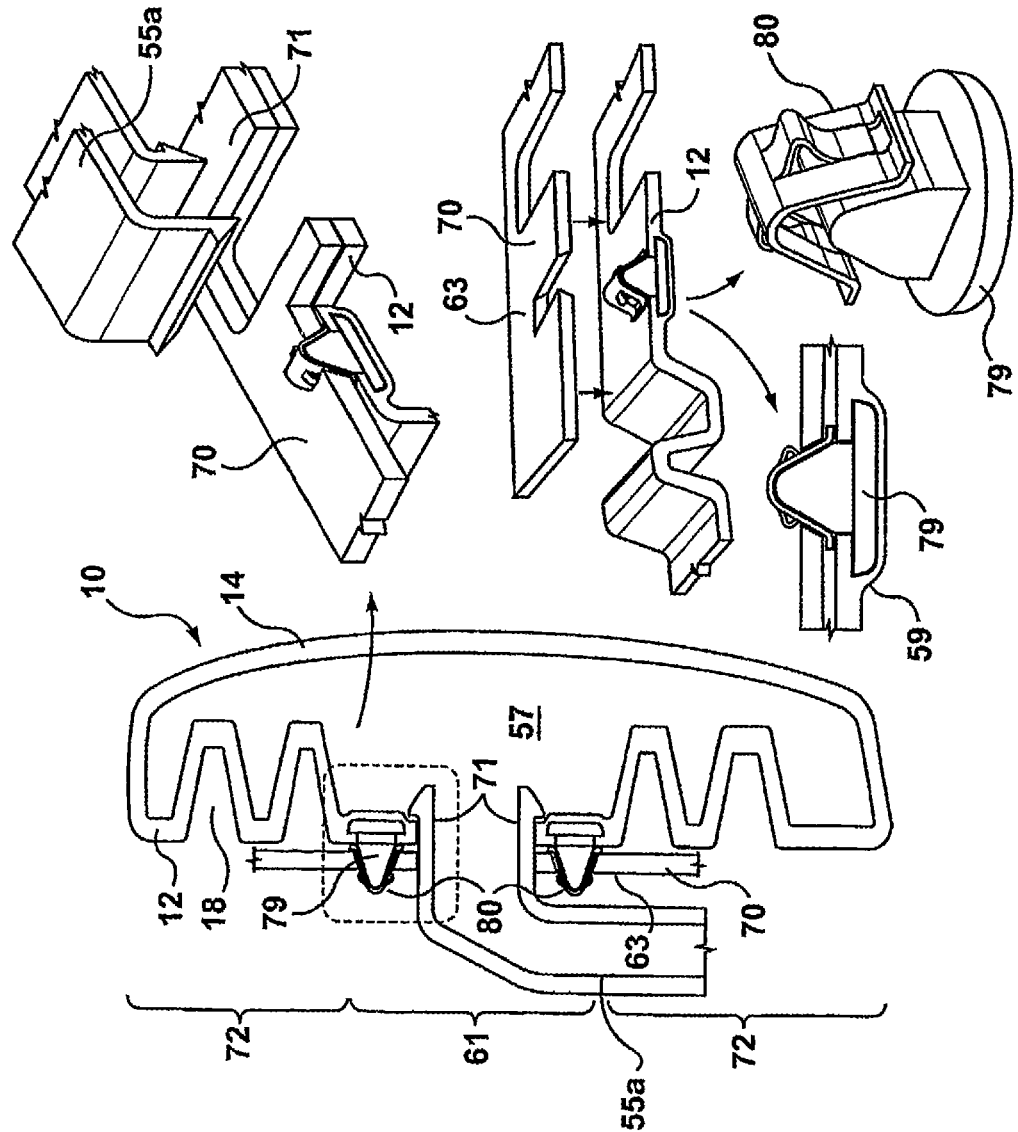

Reference is made to FIG. 19C, which shows yet another embodiment of a means to fasten an expansible chamber 57 to the door panel metal support structure 70. In this embodiment, the outside wall 12 of an expansible chamber 57 comprises insert apertures 59 appropriately sized to receive bolster tab inserts 79, which are of an appropriate thickness and size to provide the required tensile strength and other desired mechanical properties. The insert apertures 59 are positioned in the attachment portion 61, between the pleats 18 on the outer wall 12, of the expansible chamber 57 and the connection 71 between the bolster 10 and the fluid conduit 55*a*. Additional frangible fasteners (not shown) may be used to detachably attach any of the peripheral portions 72 of the outer wall 12 of the bolster, including the expansion pleats 18, to the door panel metal support structure 70 while the bolster is in its uninflated condition. Fasteners within the peripheral portions 72 of the bolster outer wall 12 can be released by inflation of the expansible chamber 57 so as to not prevent the outer wall 12 from moving relative to the side of the vehicle during inflation.

The particular attachment means embodied in FIG. 19C comprises fastening clips 80 that are placed over the bolster tab inserts 79. The fastening clips 80 can be manufactured separately and then easily affixed to the bolster tab inserts 79 prior to the bolster portion 50 being installed in the vehicle. Upon affixing the required fastening clips 80 to the bolster tab inserts 79, the bolster can be positioned relative to the door panel metal support structure 70 and aligned with the predetermined fastening locations 63 within the structure. With the fastening clips 80 properly aligned with the fastening locations 63, pressure can be applied to the bolster 10 forcing the fastening clips 80 into the fastening locations 63 and creating a snap-fit connection between the bolster 10 and the door panel metal support structure 70. This connection means can be implemented at the appropriate number of fastening locations 63 as required to produce the desired strength of mechanical connection between the bolster 10 and the door panel metal support structure 70.

While much of the foregoing description has related to the bolster portion 50, it will be appreciated that similar attachment means can be used to secure the bolster portion 50 and 52 to door panel metal support structure 70 of the door. Alternatively, bolster portion 50 and 52 may be secured to some other portion of the door, such as the panel 19.

It is optionally possible to have the bolster 10 cover substantially all of the interior surface of the door body 17*b*, so that the occupant 13 is protected regardless of the region on the door body 17 towards which they accelerate. In such an embodiment, first and second bolster portions 50 and 52 may not be required. For example, the bolster 10 could be a contiguous device that is generally C-shaped, extending above, below and aft of the armrest 26. Additionally, the bolster 10 may be configured to cover some or all of the door window 17*a* to protect the occupant from colliding therewith during a crash event. To achieve protection from the door window 17*a*, the bolster 10 would be configured to expand outwards, and to expand upwards along its top edge.

The armrest 26 itself may be formed as part of the bolster 10. By forming the bolster 10 integrally with the armrest 26, (e.g., by blow molding a combined armrest and bolster), assembly of the door 17 is simplified, since only one item (i.e., the combined armrest and bolster) needs to be installed on the door body 28 instead of two separate items. The armrest 26 in this embodiment need not be made to expand when the bolster 10 expands.

Figure 5A:
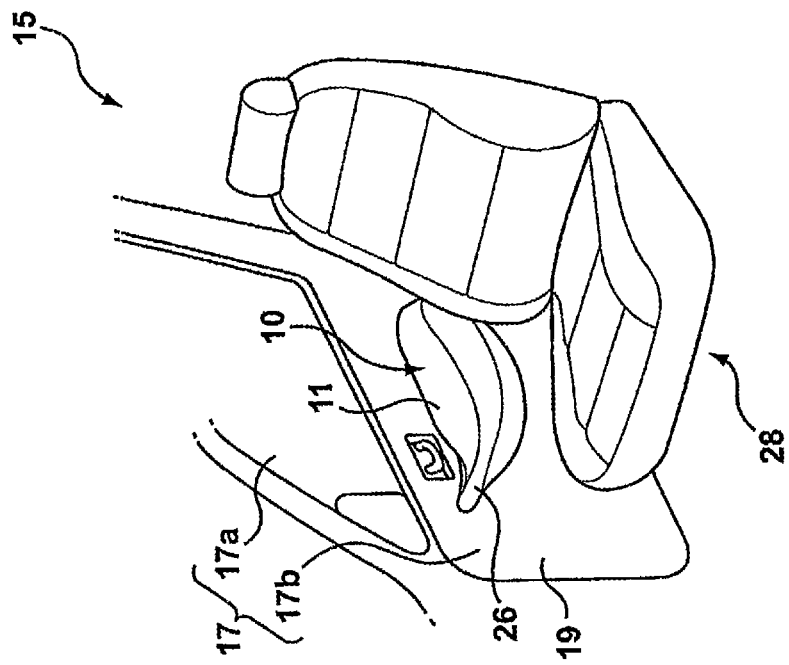
FIGS. 5A and 5B are perspective views of an armrest-mounted bolster in accordance with yet another embodiment of the present invention.
Figure 5B:
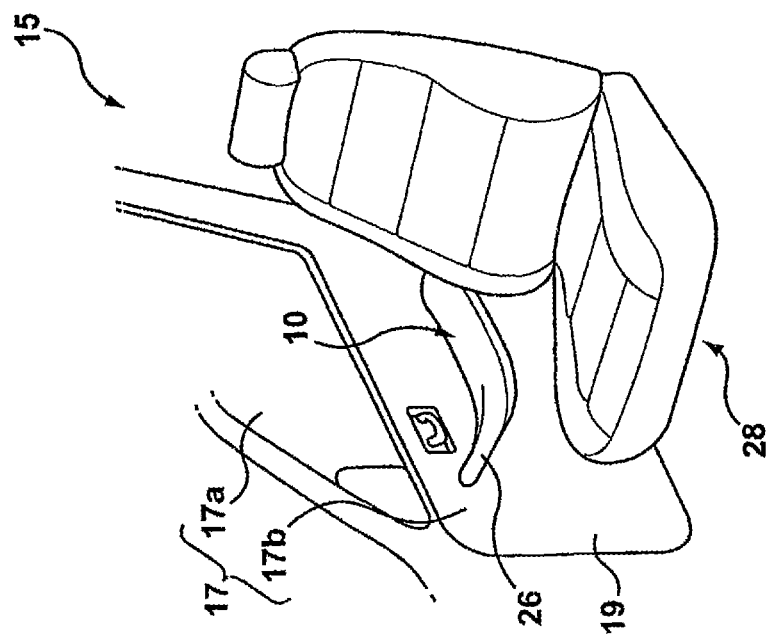

Reference is made to FIGS. 5A and 5B, in which the armrest 26 includes the bolster 10. In this embodiment, the main body 11 of the bolster 10 is the structural member of the armrest 26. The main body 11 may be finished in any suitable way to provide a suitable first surface for the armrest 26. For example, the main body 11 may be textured and may be made from a coloured polymer. Alternatively, the main body 11 may be covered by a layer of polymeric foam and a skin, such as a vinyl covering.

By incorporating the bolster 10 into the armrest 26, a savings is enjoyed by the vehicle manufacturer relative to providing two separate items, each of which have an associated cost and each of which would have to be installed on the door 17.

It is alternatively possible that the armrest 26 could act as a housing for the bolster 10. The armrest 26 could be configured to have a hinged cover that would swing open to provide an opening through which the bolster 10 could expand upwards and out to protect the occupant 13.

Reference is made to FIGS. 6A and 6B, in which the headrest, shown at 28*b* includes the bolster 10. In this embodiment, the main body 11 of the bolster 10 is also the structural member of the headrest 28*b*. Similarly to the armrest 26 in the embodiment shown in FIGS. 5A and 5B, the main body 11 may be finished in any suitable way to provide a suitable first surface for the headrest 28*b*. For example, the main body 11 may be covered by a layer of polymeric foam and a skin, such as a vinyl covering. The advantages provided by a bolster 10 that replaces the structural member of the headrest 28*b* are similar to those provided by the bolster 10, which is the structural member of the armrest 26 in the embodiment shown in FIGS. 5A and 5B.

When inflated, the bolster 10 shown in FIGS. 6A and 6B provide additional deceleration distance for the head of the occupant 13, relative to a standard passive headrest during certain types of collision. Additionally, the bolster 10, when inflated, may be configured to provide some control over lateral movement of the occupant's head, by providing a dished forward surface.

Figure 7B:
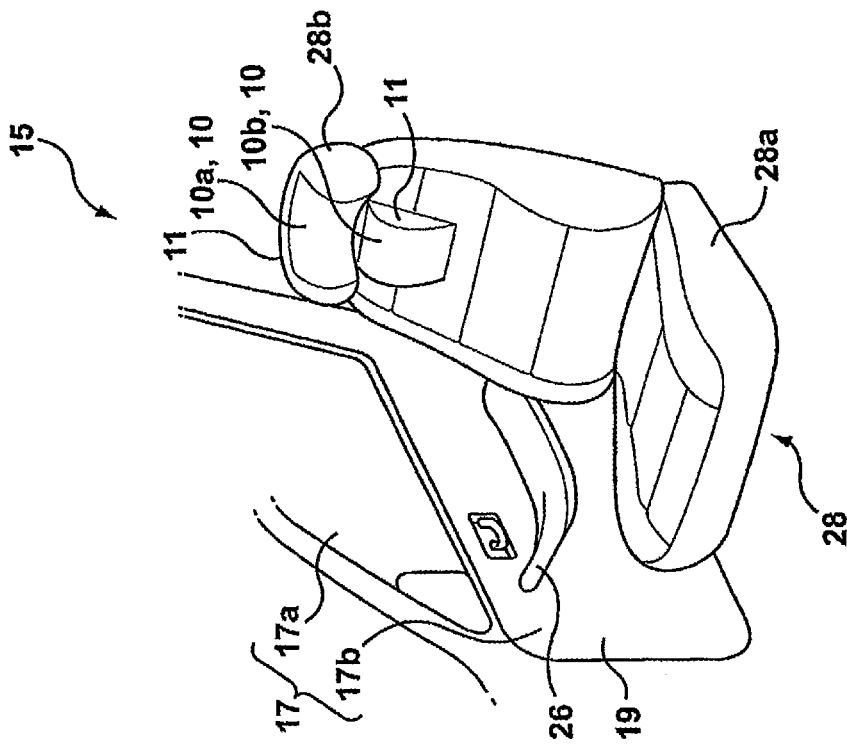
FIGS. 7A and 7B are perspective views of a headrest-mounted bolster in combination with a neck bolster, in accordance with yet another embodiment of the present invention.
Figure 7A:
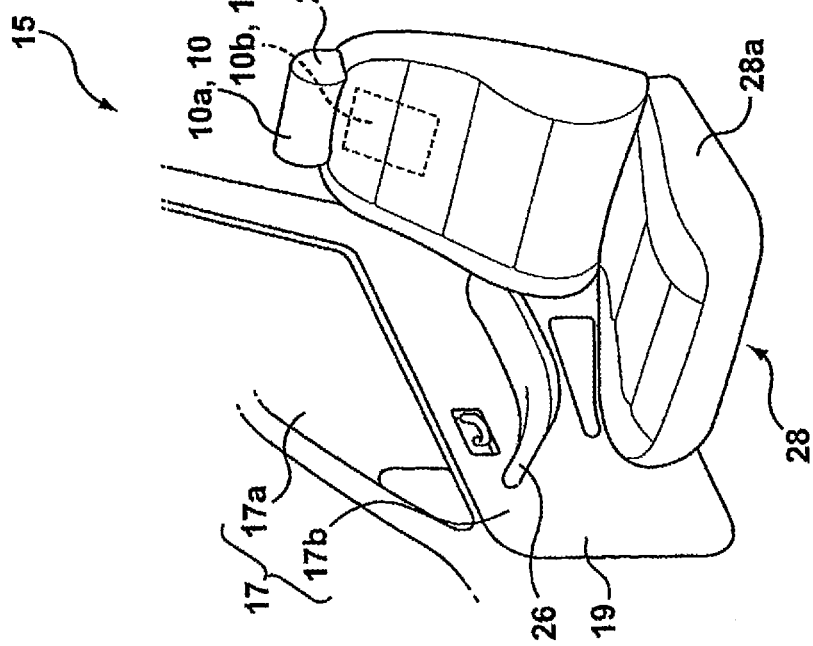

Referring to FIGS. 7A and 7B, a combination of two bolsters 10 are provided. A headrest bolster 10*a* cooperates with a neck bolster 10*b* to position the occupant's head and neck and absorb impact energy therefrom. The headrest bolster 10*a* may be similar to the headrest bolster 10 shown in FIGS. 6A and 6B. The neck bolster 10*b* is provided to occupy, in its inflated form, the generally concave space at the back of the occupant's neck when the occupant's head encounters the inflated headrest bolster 10*a*. By cooperating together, the headrest and neck bolsters 10*a* and 10*b* lengthen the deceleration of the occupant's head and neck, thereby reducing the likelihood of injury to the occupant, and in particular reducing the likelihood of whiplash.

Reference is made to FIGS. 8A and 8B, which show two bolsters 10. When the vehicle undergoes certain types of crash event, the occupant 13 is urged forward, and may be urged in such a manner as to slide forward through the shoulder belt, shown at 30*a* and through the hip belt, shown at 30*b*, towards the foot well (not shown). This is colloquially known as 'submarining'. In this embodiment, the two bolsters 10 cooperate together to assist in maintaining the occupant 13 in the seat 28 and inhibit submarining of the occupant 13.

The bolsters 10 include a lumbar bolster 10*c* and a forward pelvic bolster 10*d*. The lumbar bolster 10*c* is positioned on the seat's backrest, shown at 28*c*, and, when inflated, is configured to push the body-supporting surface of the seat 28 and the occupant's torso forward.

The forward pelvic bolster 10*d* is positioned at the forward edge of the seat bottom portion 28*a*, and is configured, in its inflated position, to raise the body-supporting surface of the seat 28 and the knees of the occupant 13 and to cup the pelvic region of the occupant 13 at the junction of the seat bottom portion 28a and the backrest 28c.

Thus, when the occupant 13 is belted in, the lumbar bolster 10c and the forward pelvic bolster 10d cooperate to 'fold' the occupant about the pelvic region. This folding of the occupant 13 impedes the occupant from sliding down and forward through the shoulder and hip belts 30a and 30b towards the foot well (not shown) during a crash event.

It is possible to provide either the lumbar bolster 10c alone or the forward pelvic bolster 10d alone to assist in inhibiting submarining instead of providing two bolsters 10c and 10d together. However, providing the two bolsters 10c and 10d together is preferable.

Instead of rupturing a continuous seat surface during inflation, the main bodies 11 of the lumbar and forward pelvic bolsters 10c and 10d may be finished in such a way as to form part of the first surfaces of the seat 28. For example, the main body 11 of each may be covered with a suitable layer of polymer foam and with a skin of any suitable material, such as leather or cloth. The skin on the main body 11 would be a separate panel from the rest of the seating surfaces of the seat bottom portion 28a and the backrest 28c. Thus, when either or both of the lumbar and forward pelvic bolsters 10c and 10d deploy, they do not rupture the seat covering that makes up the rest of the seating surface. Alternatively, the bolsters 10c and 10d may be buried within the seat bottom portion 28a and the backrest 28c, under a layer of foam that may be contiguous, and under a contiguous skin.

Reference is made to FIGS. 9A and 9B, which show an outside pelvic bolster 10, which assists in decelerating the pelvic region of the occupant 13 during certain types of crash event. As with the bolsters 10c and 10d shown in FIGS. 8A and 8B, the main body 11 of the bolster 10 in FIGS. 9A and 9B, may be covered with a suitable layer of polymer foam and with a suitable skin, which may be separate from the skin on the rest of the seating surface of the backrest 28c. It is optionally possible for the bolster 10 to extend upwards farther along the backrest 28c, or to be positioned farther up along the backrest 28c to control the deceleration of other regions on the occupant's torso in addition to, or instead of, controlling the deceleration of the pelvic region.

Reference is made to FIGS. 10A and 10B, which show the bolster 10 positioned on the rear face of the backrest 28c. The bolster 10 deploys to protect the legs of the occupant (not shown) positioned in the seat (not shown) behind the seat 28.

Figure 11B:
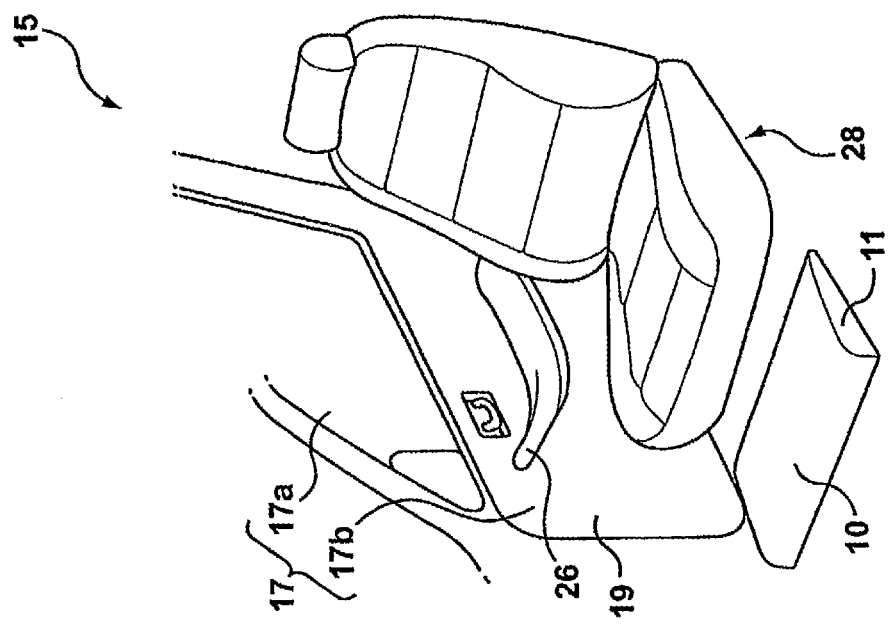
FIGS. 11A and 11B are perspective views of a floor pan-mounted bolster, in accordance with yet another embodiment of the present invention.
Figure 11A:
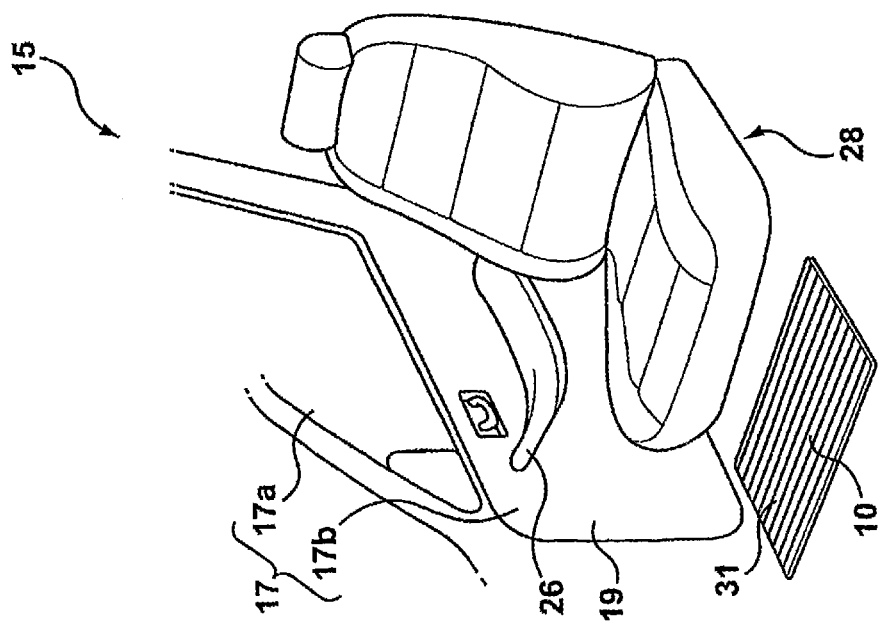

Reference is made to FIGS. 11A and 11B, which show a bolster 10 mounted on the floor pan of the vehicle 15. The bolster 10 deploys to control the position of the feet of the occupant 13 during certain types of crash event. The bolster 10 supports the feet of the occupant 13 from underneath via a foot-supporting surface that is displaced by inflation of the bolster 10.

The main body 11 of the bolster 10 may be finished with a covering layer of carpeting and may thus form part of the floor carpeting in the vehicle. Additionally or alternatively, the main body 11 may have a series of drain channels 31 formed thereon to drain water and snow away from the feet of the occupant 13 if the occupant's shoes are wet or snowy.

Figure 12A:
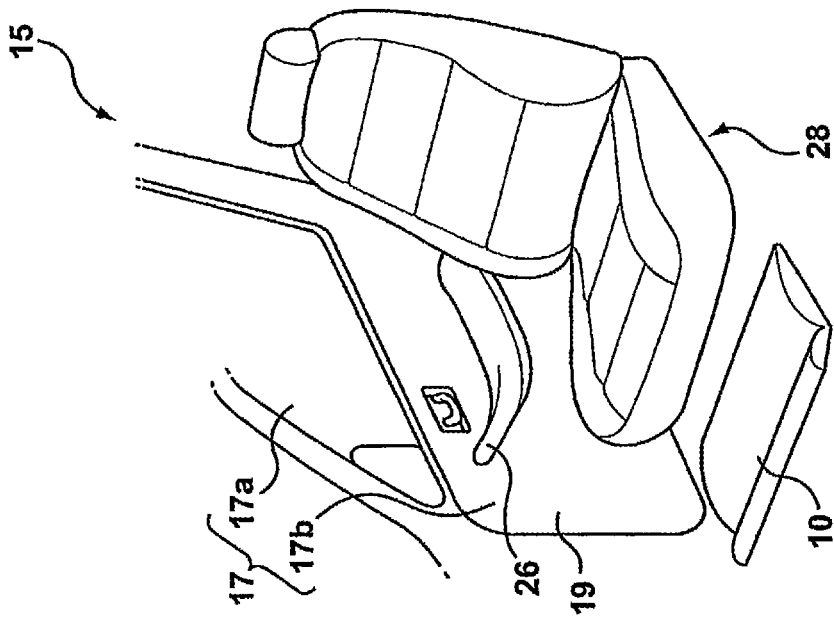
FIGS. 12A and 12B are perspective views of a bolster mounted on both the floor pan and the toe pan, in accordance with yet another embodiment of the present invention.
Figure 12B:
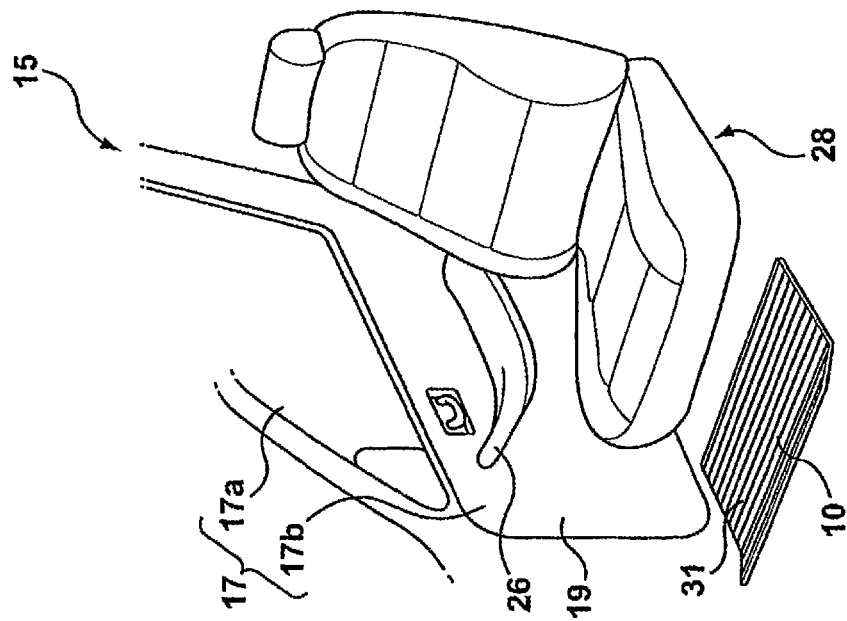

Referring to FIGS. 12A and 12B, the bolster 10 may be positioned in part in the floor pan of the vehicle and in part in the toe pan. The bolster 10 may include the carpet covering and/or the drain channels 31 that are optionally provided on the bolster 10 shown in FIGS. 11A and 11B.

Figure 13C:
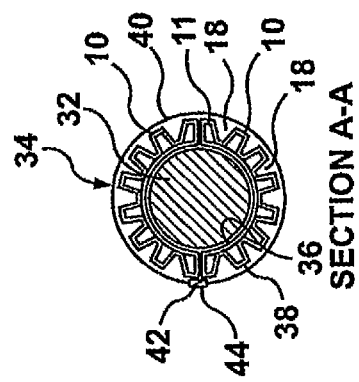
FIG. 13C is a sectional side view of a bolster and a rollover protection bar shown in FIG. 13A.
Figure 13A:
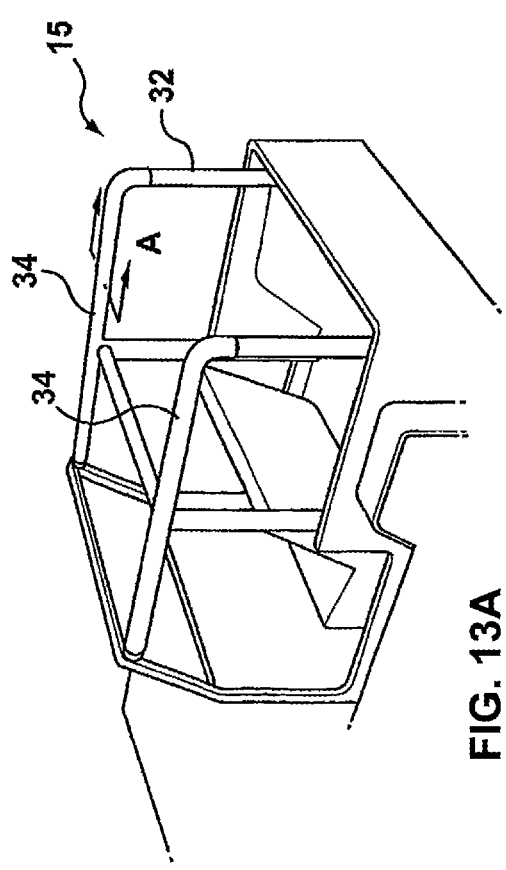
FIGS. 13A and 13B are perspective views of a bolster mounted on rollover protection bars on a vehicle, in accordance with yet another embodiment of the present invention.
Figure 13B:
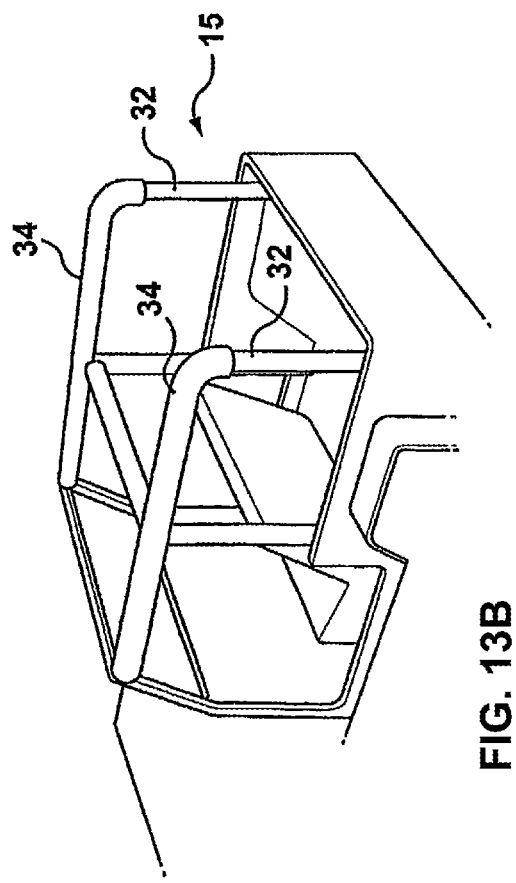

Referring to FIGS. 13A, 13B and 13C, one or more bolster systems 34 may be positioned about one or more rollover protection bars 32 which may be provided on the vehicle. Each bolster system 34 surrounds the associated rollover protection bar 32 and slow the deceleration of a vehicle occupant 13 prior to the occupant 13 encountering the rollover protection bar 32 during certain types of crash event. Referring to FIG. 13C, each bolster system 34 may include first and second bolsters 10, which together cover a rollover protection bar 32 circumferentially. Each bolster 10 includes a hollow main body 11, which is shaped to have a radially inner surface 36 which contacts and engages rollover protection bar 32, and which has a radially outer surface 38, in which there are a plurality of pleats 18. The pleats 18 permit the bolster 10 to expand radially when inflated.

It is alternatively possible for the pleats 18 to be omitted from the main body 11, and to cause expansion of the main body 11 by plastic deformation that occurs as a result of the introduction of pressurized gas into the main body 11.

The bolsters 10 may be housed in a covering layer 40. The covering layer 40 holds the bolsters 10 together about the rollover protection bar 32. Additionally, the covering layer 40 hides the pleats 18 on the bolsters 10, if pleats 18 are present. The covering layer 40 may be a tubular piece that is open at its ends and that has a longitudinally extending opening 42. The bolsters 10 may be introduced into the covering layer 40 through the open ends or by stretching open the longitudinal opening 42. The covering layer 42 is fit over the rollover bar 32 by stretching open the opening 42. The covering layer 40 may include one or more connectors 44 to permit the opening 42 to be held closed.

It is alternatively possible to have a single bolster 10, which is held within the covering layer 40. The single bolster 10 would have a longitudinally extending opening, and could be made to be flexible enough to open around the rollover bar 32.

When pressurized gas is introduced into the bolsters 10 during bolster deployment, the bolsters 10 expand radially outwards and force the covering layer 40 to either stretch radially outwardly or to open at the opening 42.

Figure 14A:
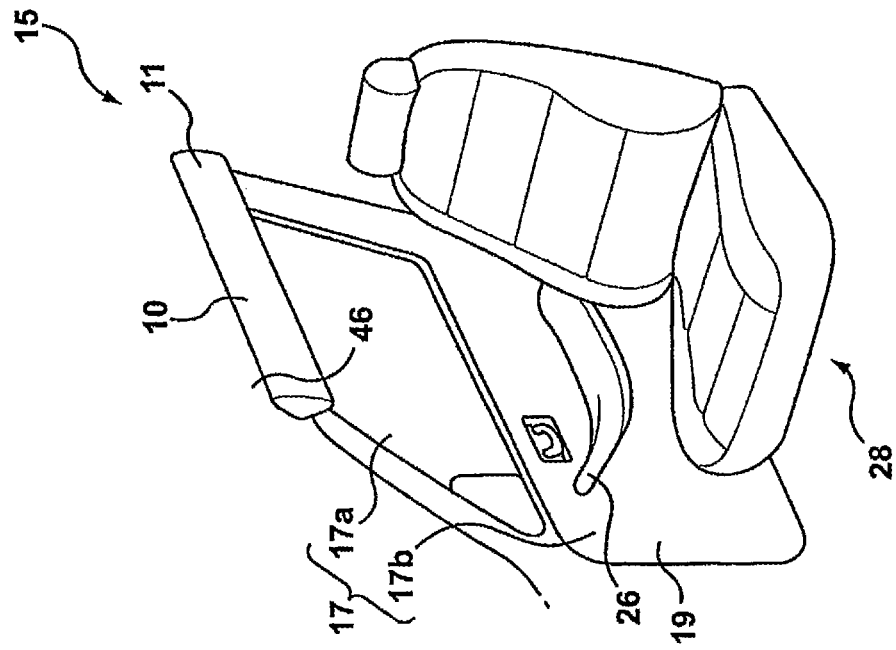
FIGS. 14A and 14B are perspective views of a roof-mounted bolster in accordance with yet another embodiment of the present invention.
Figure 14B:
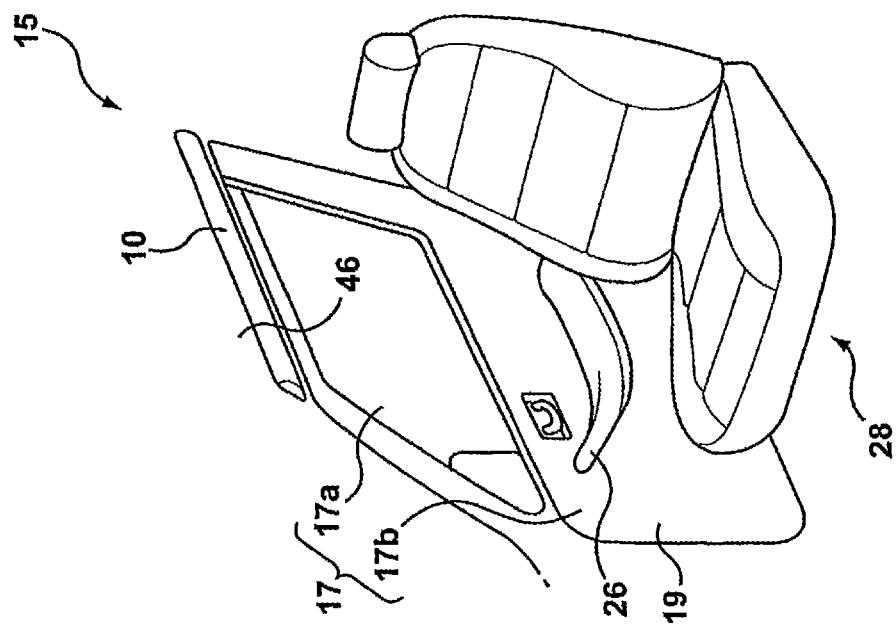

Reference is made to FIGS. 14A and 14B, which show the bolster 10 positioned on the vehicle roof, shown at 46. The bolster 10 deploys to extend downwards to assist in controlling the deceleration of the occupant 13 towards the door window 17a and in particular towards the junction between the door 17 and the roof 46. The main body 11 of the bolster 10 may be finished to as to directly act as the first surface, or may be covered by a suitable piece of material that acts as the first surface. Alternatively, the main body 11 may be hidden from view by the headliner.

It is optionally possible for the bolster 10 to extend farther downwards than is shown in FIG. 14B, so that it can protect the head of the occupant from hitting relatively lower regions on the door window 17a.

Reference is made to FIGS. 14A and 14B, which show the bolster 10 positioned on the vehicle's B-pillar, shown at 48. The bolster 10 and may be configured to extend forwardly, rearwardly and inwardly away from the B-pillar.

It is optionally possible for the bolster 10 to be positioned on any of the A, B, C or D pillars (if present) in the vehicle, to protect vehicle occupants in situations where there is a risk of collision with those regions in the vehicle.

Figure 15B:
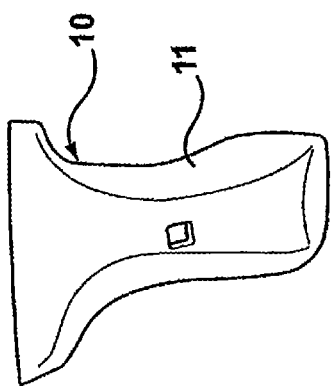
FIGS. 15A and 15B are perspective views of a pillar-mounted bolster in accordance with yet another embodiment of the present invention.
Figure 15A:
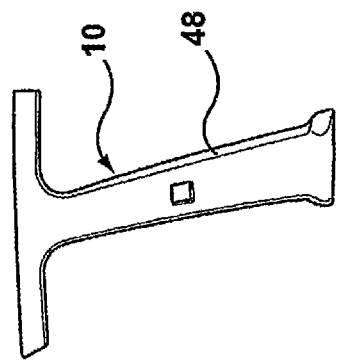

The main body 11 may be finished or covered suitably to act as the first surface in pillar-mounted embodiments, such as the embodiment shown in FIGS. 15A and 15B.

Figure 20A:
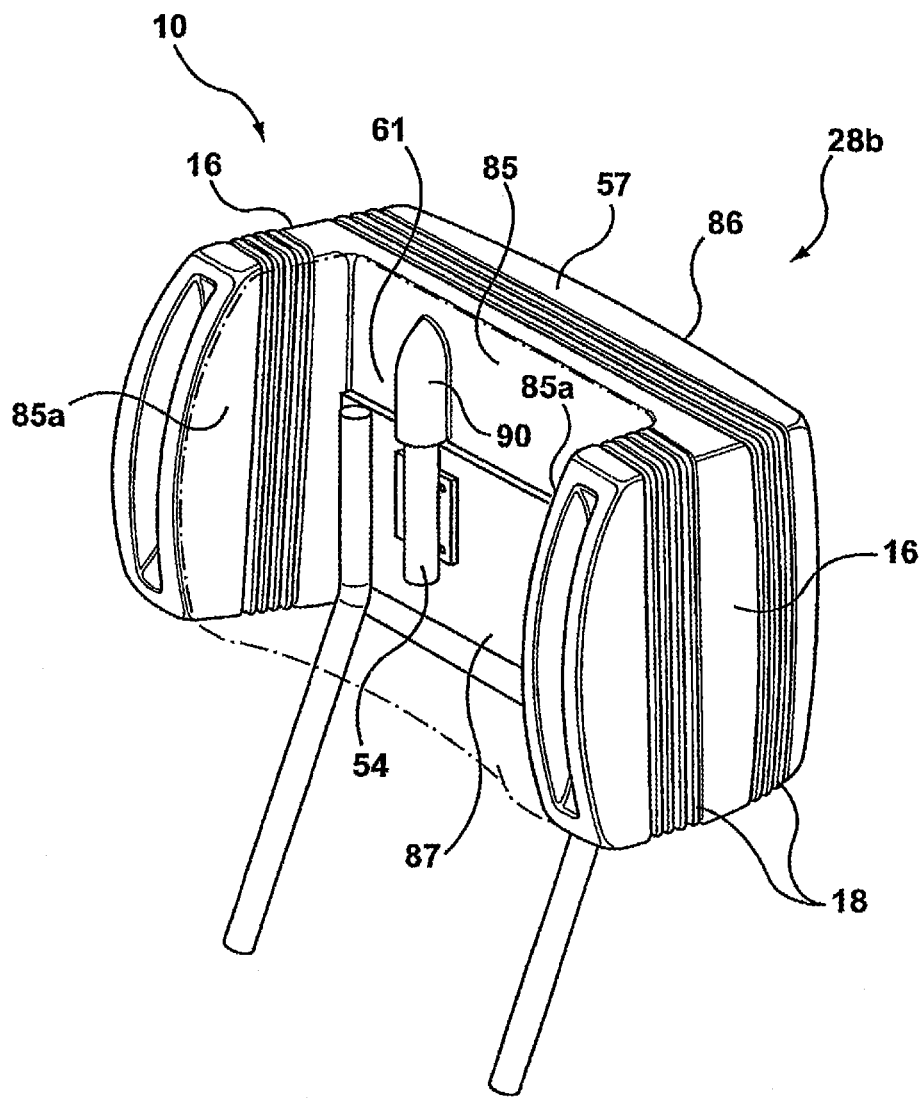
FIG. 20A is a perspective view of a headrest bolster in accordance with a further embodiment of the invention in an un-inflated configuration.

Referring to FIG. 20A, a headrest 28*b* in accordance with a further embodiment of the invention is shown in a perspective view. The headrest 28*b* comprises a bolster 10 mounted on a headrest mounting bracket 87. The bolster 10 comprises a rear wall 86, side walls 16, and relatively non-expansible front wall 85 and front inside walls 85*a* enclosing an expansible hollow interior 57. The bolster 10 further comprises an inflator 54, which is attached to the headrest mounting bracket 87, and an inflation aperture 90 that is integral to the front wall 85 of the bolster 10. The inflator 54 is located outside of expansible hollow interior 57 of the bolster 10. The headrest mounting bracket 87 positions the bolster 10 in an appropriate location relative to the vehicle seat back 28*d* (shown in FIG. 21A). The headrest mounting bracket 87 is rigidly fixed to the vehicle seat back 28*d* by an appropriate, secure fastening means (not shown). The front wall 85 of the bolster 10 is relatively non-expansible and comprises an attachment portion 61 that is rigidly attached to the headrest mounting bracket 87 using an appropriate fastening means (not shown). The rigid attachment portion 61 connecting the relatively non-expansible front wall 85 and the headrest mounting bracket 87 is required to hold the bolster 10 in place during routine operation of the vehicle and to ensure that the bolster 10 remains in place during inflation.

The side walls 16 of the bolster 10 comprise expansion pleats 18. The number and design of the pleats may be used to control the direction and magnitude of the expansion of the expansible hollow interior 57 of the bolster 10. During inflation, the front wall 85 and the front inside walls 85*a* remain in place while the rear wall 86 and the side walls 16 extend away from the headrest support bracket 87 and toward the back of the vehicle. The front inside walls 85*a* are designed to allow for the bolster 10 to extend in the forward direction but to prevent expansion by the bolster 10 in the inward direction, toward the head of the vehicle occupant to prevent injury.

Figure 20B:
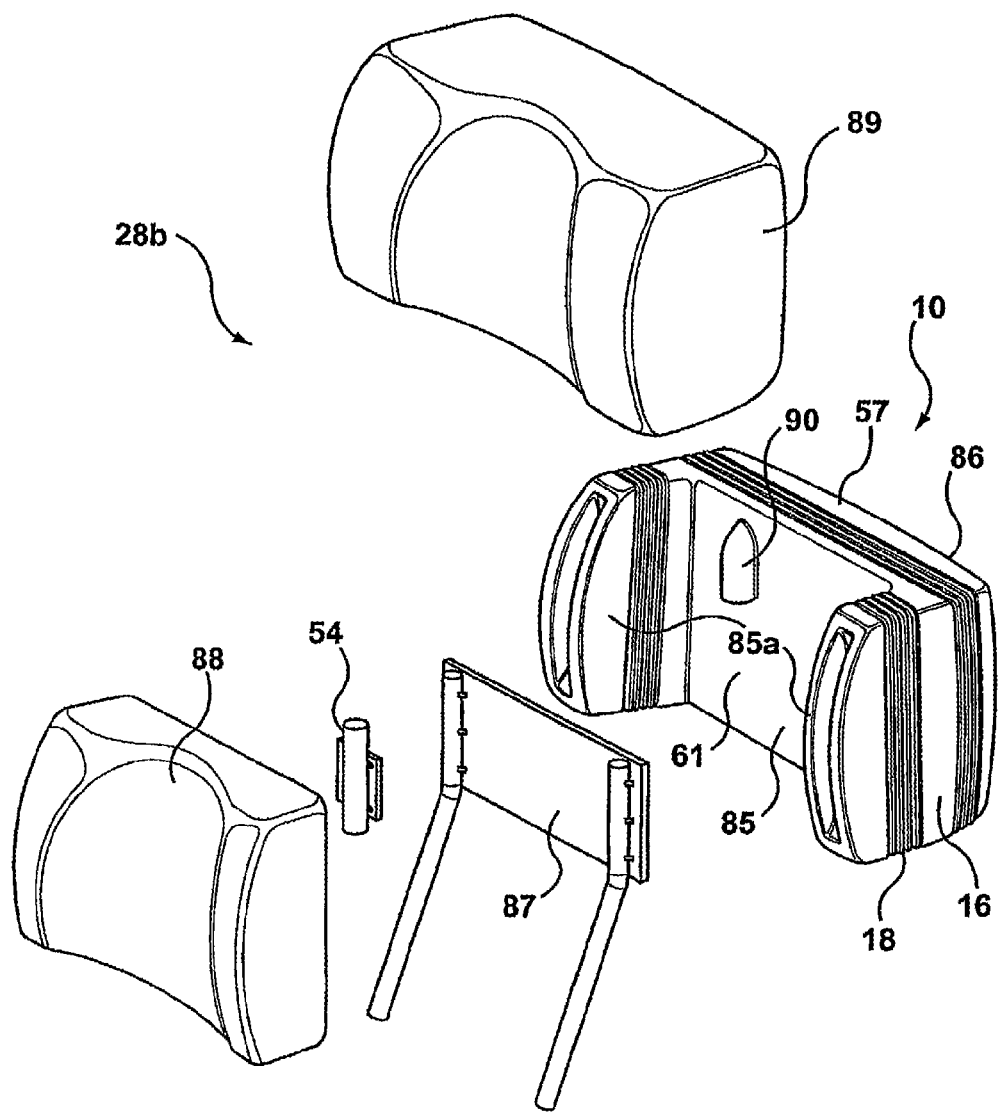
FIG. 20B is an exploded view of the bolster shown in FIG. 20A.
Figure 20C:
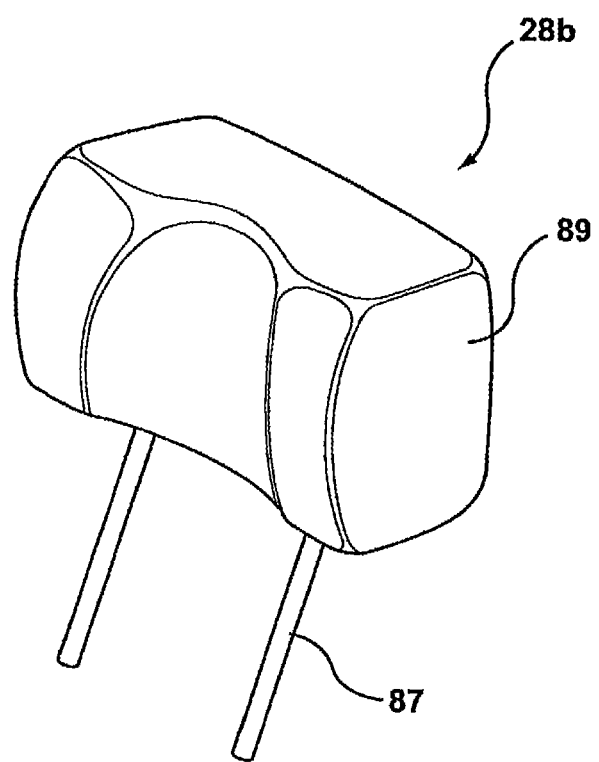
FIG. 20C is an assembled perspective view of the bolster shown in FIG. 20A covered with a headrest cover in an un-inflated configuration.

Referring to FIG. 20B, the headrest 28*b* as shown in FIG. 20A is shown in an exploded view. This figure also shows a portion of non-expansible padding material 88 designed to provide static support to the head of the vehicle occupant 13. The non-expansible padding 88 is rigidly attached to the headrest mounting bracket 87 by an appropriate attachment means (not shown) and is designed to fill the cavity bounded by the bolster 10 front 85 and front inside 85*a* walls. An external headrest cover 89 is also shown in this figure. The external headrest cover 89 is installed on an assembled headrest 28*b* and may be finished appropriately to act as a first surface. Referring to FIG. 20C, a headrest 28*b* as shown in FIGS. 20A and 20B is shown with the headrest cover 89 in place and headrest mounting bracket 87 visible.

Figure 20D:
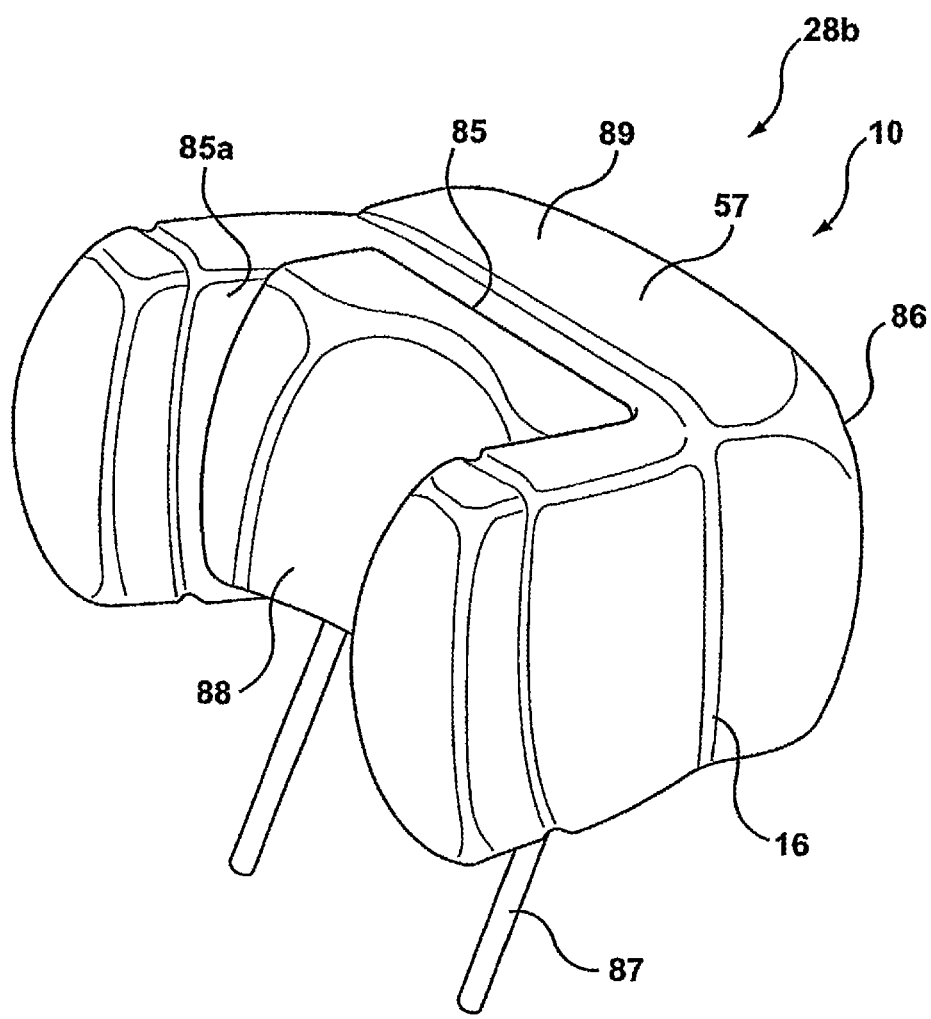
FIG. 20D is an assembled perspective view of the bolster shown in FIG. 20C in an inflated configuration.

Referring to FIG. 20D, the headrest 28*b* as shown in FIGS. 20A, 20B and 20C is shown in an inflated configuration. This figure shows the relative displacement of the rear 86 and side walls 16 of the bolster 10 due to the expansion of the pleats 18 (shown in FIG. 20A) and expansible hollow interior 57. This figure also shows the non-expansible padding material 88, front wall 85, and front inside walls 85*a* remaining in place relative to the headrest mounting bracket 87 after inflation.

Figure 21A:
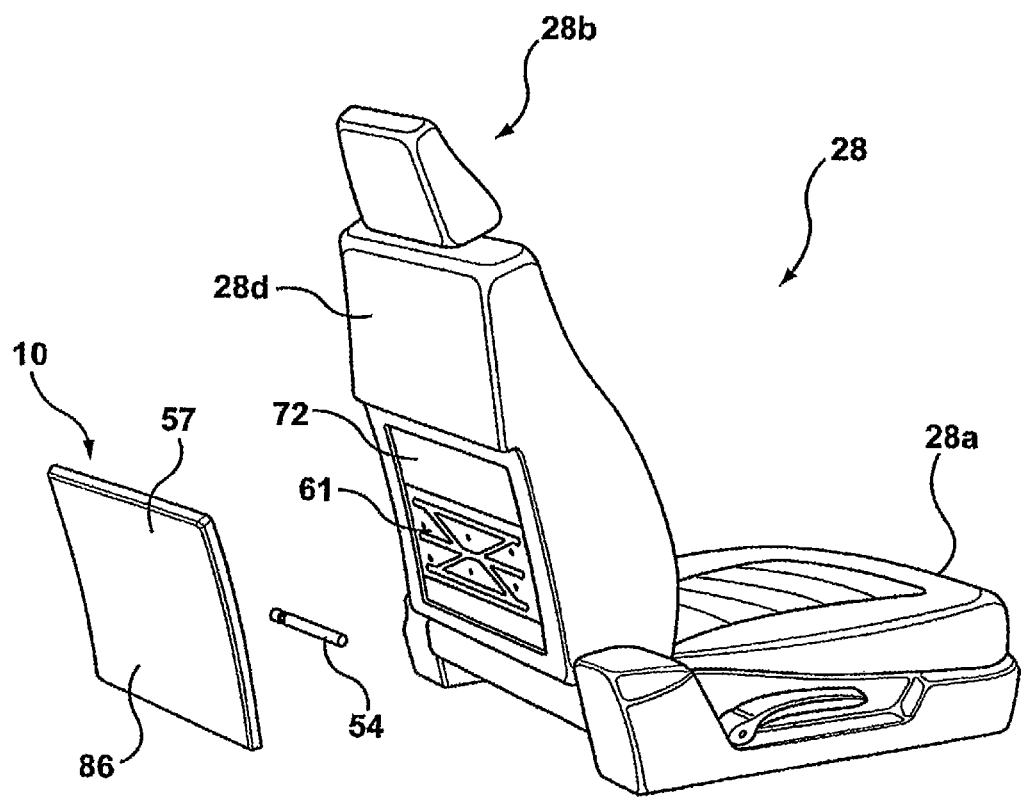
FIG. 21A is an exploded view of a seat back mounted bolster, in accordance with a further embodiment of the invention, shown in an un-inflated configuration.

Referring to FIG. 21A, a seat back 28*d* bolster 10 is shown in accordance with a further embodiment of the invention. A seat 28 is shown comprising a seat bottom portion 28*a*, a headrest portion 28*b*, and a seat back portion 28*d*. The seat back portion 28*d* further comprises an attachment portion 61 and a peripheral portion 72. The attachment portion 61 and peripheral portion 72 are designed to appropriately mount a bolster 10 which is deployed to protect vehicle passengers riding in the backseat of the vehicle. This figure also shows a bolster 10 to be affixed to the seat back 28*d*. The bolster 10 further comprises a occupant side wall 86, that forms part of the boundary of an expansible hollow interior 57, and an inflator module 54 that is used to inflate the expansible hollow interior 57 of the bolster 10.

Figure 21B:
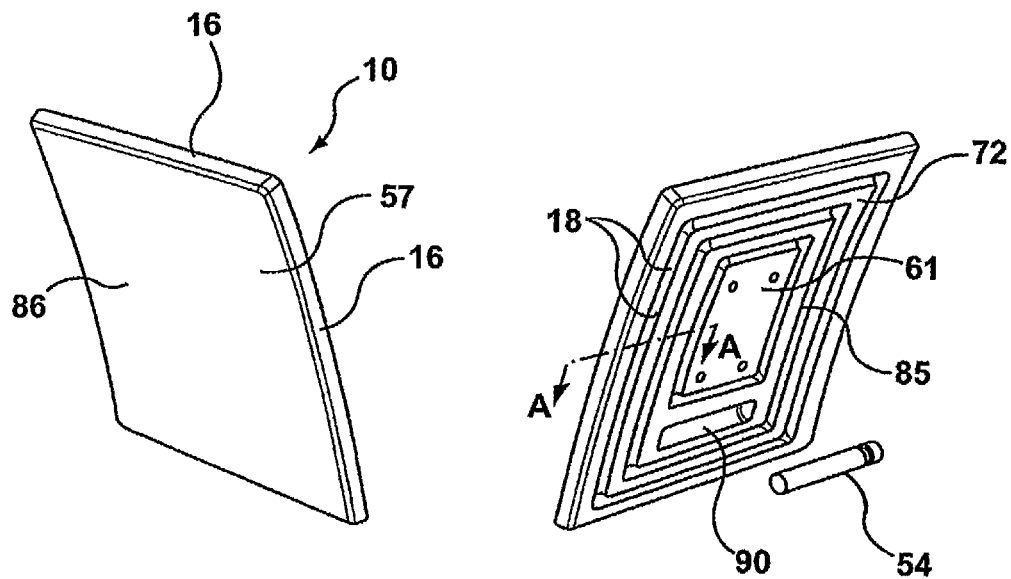
FIG. 21B is a perspective view of the bolster shown in FIG. 21A shown in an un-inflated configuration.

Referring to FIG. 21B, the bolster 10 as shown in FIG. 21A is shown comprising an occupant side wall 86, side walls 16, and a seat side wall 85 which serve to bound an expansible hollow interior 57. The seat side wall 85 of the bolster 10 further comprises an attachment portion 61 and a peripheral portion 72. The attachment portion 61 of the bolster 10 is rigidly attached to the seat back 28*d* (as shown in FIG. 21A) by an appropriate fastening means (not shown). The attachment means is such that the portion of the seat side wall 85 of the bolster 10 within the attachment portion 61 of the bolster is held in place during normal operation and inflation of the bolster 10. Portions of the bolster seat side wall 85 contained within the attachment portion 61 of the bolster 10 cannot move relative to the seat back attachment portion (designated using reference numeral 61 in FIG. 21A). Peripheral portions 72 of the bolster seat side wall 85 may be attached to the seat back 28*d* (not shown) by appropriate frangible fastening means (not shown) such that the bolster 10 is held in place during normal operation of the vehicle but also such that the attachment means is released by the inflation of the expansible hollow interior of the bolster 10 allowing the seat side wall 85 to move away from the seat back 28*d* and toward the back of the vehicle. The bolster seat side wall 85 further comprises expansion pleats 18 that allow for the inflation of the expansive hollow interior 57 of the bolster 10 and can also be designed appropriately to control the extent and direction of expansion. The bolster 10 is shown in an un-inflated configuration.

The bolster 10 shown in FIG. 21B further comprises an integral inflation aperture 90 that accepts an inflator module 54 via an appropriate coupling means (not shown).

Figure 21C:
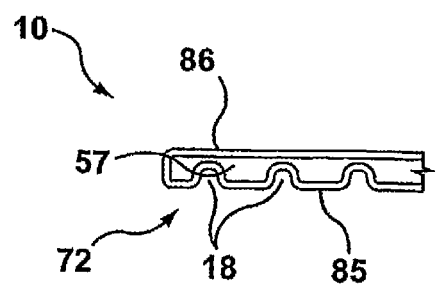
FIG. 21C is a sectioned view of the bolster shown in FIG. 21A shown in an un-inflated configuration.

Referring to FIG. 21C, a sectioned view of the bolster 10 shown in FIG. 21B shows the expansion pleats 18 and peripheral portion 72 of the seat side wall 85 of the bolster 10. This figure also shows a sectioned view of the occupant side wall 86 and expansible hollow interior 57 of the bolster 10 in its un-inflated configuration.

Figure 21D:
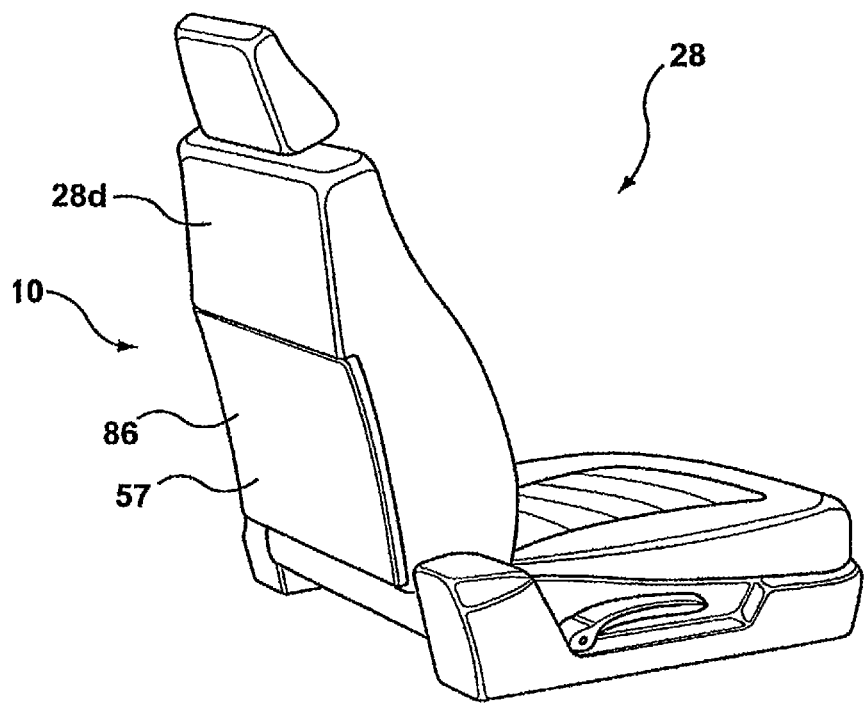
FIG. 21D is a perspective assembled view of the bolster shown in FIG. 21A shown in an un-inflated configuration.

Referring to FIG. 21D, a perspective view of a seat 28 and seat back 28*d* shows the relative position of the bolster 10 shown in FIGS. 21A and 21B as attached to the seat back 28*d* in an un-inflated configuration. The occupant side wall 86 of the expansible hollow interior 57 of the bolster 10 may be suitably covered or finished to serve as a first surface. During inflation of the expansible hollow interior 57, the occupant side wall 86 of the bolster 10 will move away from the seat back 28*d* and toward the back of the vehicle.

Figure 21E:
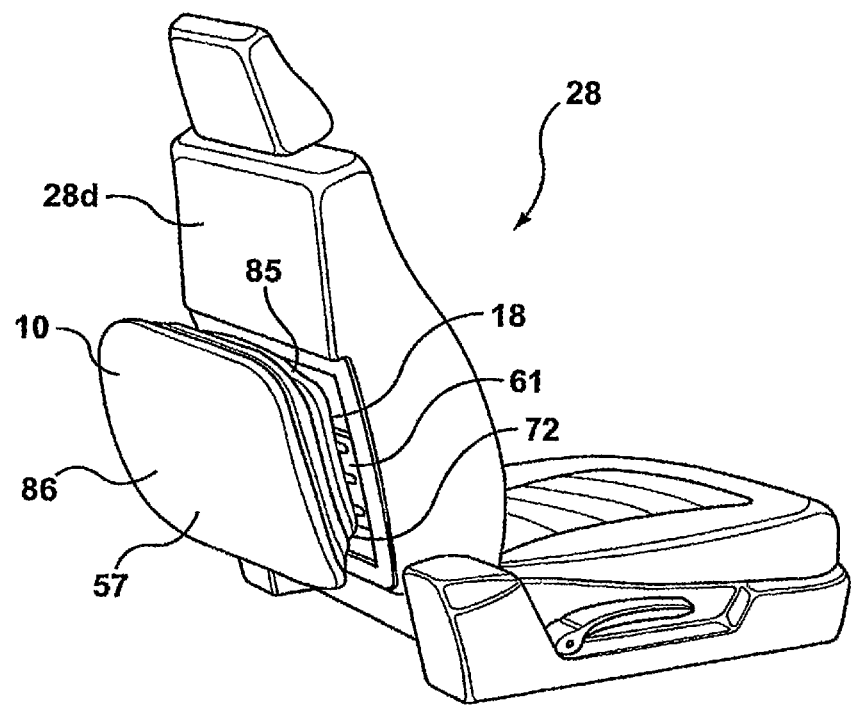
FIG. 21E is a perspective assembled view of the bolster shown in FIG. 21A shown in an inflated configuration.

Referring to FIG. 21E, a perspective view of a seat 28 and seat back 28*d* shows the relative position of the bolster 10 shown in FIGS. 21A, 21B, and 21D as attached to the seat back 28*d* in an inflated configuration. This figure shows the relative displacement away from seat back 28*d* of the occupant side wall 86 and peripheral portions 72 of the seat side wall 85 of the bolster 10 during the inflation of the expansible hollow interior 57. The expansion pleats 18 are shown in their extended positions. The attachments between the seat side wall 85 and the seat back 28*d* contained within the attachment portion 61 remain intact during expansion, and this portion of the seat side wall 85 does not extend away from the seat back 28*d*.

Several of the bolster embodiments shown in the Figures are made oversized so that they protect a relatively wide range of sizes of vehicle occupant and to protect occupants over a relatively wide range of seat adjustment positions in the vehicle. In other words, the bolsters 10 may be sized to protect an occupant whether his/her seat is adjustment to its rearmost available position or its forwardmost position.

As will be apparent to persons skilled in the art, various modifications and adaptations of the apparatus described above may be made without departure from the present invention, the scope of which is defined in the appended claims.

The invention claimed is:

1. A vehicle seat comprising:
a body-supporting surface;
a back surface opposite to the body-supporting surface; and
an inflatable blow molded thermoplastic bolster having i) an expansible hollow portion, ii) an inflator module for inflating the expansible hollow portion, and iii) an occupant-side wall for projecting away from the seat on inflation of the expansible hollow portion to displace at least one of the body-supporting surface or the back surface, wherein the inflatable blow-molded thermoplastic bolster is self-supporting when in an inflated position and self-supporting in an uninflated position, wherein the body-supporting surface comprises i) an upper portion for supporting a back of an occupant, and ii) a lower portion for supporting a pair of upper legs of the occupant, and wherein the inflatable bolster is operable to displace at least one of the upper portion and the lower portion of the body-supporting surface on inflation of the expansible hollow portion, and
wherein the inflatable bolster is operable to displace both the upper portion and the lower portion of the body-supporting surface to fold the occupant around a seat belt.

2. The vehicle seat as defined in claim 1 wherein the body-supporting surface is supported by a first side of the occupant-side wall such that the first side of the occupant-side wall is operable to support an occupant before inflation.

3. The vehicle seat as defined in claim 1 wherein the body-supporting surface is a first side of the occupant-side wall, such that the first side of the occupant-side wall is operable to support an occupant before inflation.

* * * * *